United States Patent
Zhou et al.

(10) Patent No.: US 7,558,033 B2
(45) Date of Patent: Jul. 7, 2009

(54) ARC FAULT CIRCUIT INTERRUPTER AND METHOD OF PARALLEL AND SERIES ARC FAULT DETECTION

(75) Inventors: Xin Zhou, Franklin Park, PA (US); John J. Shea, Pittsburgh, PA (US); Joseph C. Engel, Monroeville, PA (US); Kevin L. Parker, Pittsburgh, PA (US); Theodore J. Miller, Oakdale, PA (US)

(73) Assignee: Eaton Corporation, Cleveland, OH (US)

( * ) Notice: Subject to any disclaimer, the term of this patent is extended or adjusted under 35 U.S.C. 154(b) by 183 days.

(21) Appl. No.: 11/679,281

(22) Filed: Feb. 27, 2007

(65) Prior Publication Data

US 2008/0204949 A1     Aug. 28, 2008

(51) Int. Cl.
*H02H 3/00* (2006.01)
*H02H 9/08* (2006.01)
*H02H 7/26* (2006.01)
*H02H 3/08* (2006.01)
*H02H 9/02* (2006.01)

(52) U.S. Cl. .............................. 361/42; 361/43; 361/44; 361/45; 361/46; 361/47; 361/48; 361/49; 361/50; 361/69; 361/93.1

(58) Field of Classification Search .................... None
See application file for complete search history.

(56) References Cited

U.S. PATENT DOCUMENTS

| | | | |
|---|---|---|---|
| 5,206,596 A | 4/1993 | Beihoff et al. | |
| 5,224,006 A | 6/1993 | MacKenzie et al. | |
| 5,691,869 A | 11/1997 | Engel et al. | |
| 5,729,145 A | 3/1998 | Blades | |
| 5,835,321 A | 11/1998 | Elms et al. | |
| 5,933,305 A | 8/1999 | Schmalz et al. | |
| 5,963,406 A * | 10/1999 | Neiger et al. | 361/42 |
| 6,414,829 B1 | 7/2002 | Haun et al. | |
| 6,504,692 B1 * | 1/2003 | Macbeth et al. | 361/42 |
| 6,522,228 B2 | 2/2003 | Wellner et al. | |
| 6,522,509 B1 | 2/2003 | Engel et al. | |
| 6,542,056 B2 | 4/2003 | Nerstrom et al. | |
| 6,590,757 B2 | 7/2003 | Pahl et al. | |
| 6,710,688 B2 | 3/2004 | Wellner et al. | |
| 6,798,628 B1 * | 9/2004 | Macbeth | 361/42 |
| 7,110,864 B2 | 9/2006 | Restrepo et al. | |
| 7,148,696 B2 | 12/2006 | Zhou et al. | |
| 7,161,775 B2 | 1/2007 | Schmalz | |

(Continued)

OTHER PUBLICATIONS

Underwriters Laboratories, Inc., "UL 1699 Arc-Fault Circuit-Interrupters", Apr. 7, 2006, 112 pp.

*Primary Examiner*—Stephen W Jackson
*Assistant Examiner*—Dharti H Patel
(74) *Attorney, Agent, or Firm*—Martin J Moran

(57) ABSTRACT

An arc fault circuit interrupter includes separable contacts, a neutral conductor, an operating mechanism structured to open and close the separable contacts, at least one current sensor structured to sense current flowing through the separable contacts and output a sensed current value; and a processor. The processor includes a first routine structured to provide parallel arc fault detection, a second routine structured to provide series arc fault detection, and a third routine structured to enable the first routine and disable the second routine for a predetermined time when the sensed current value is greater than a predetermined value and to enable the second routine and disable the first routine for the predetermined time when the sensed current value is less than the predetermined value.

26 Claims, 13 Drawing Sheets

U.S. PATENT DOCUMENTS

| | | |
|---|---|---|
| 2003/0038640 A1 | 2/2003 | Zuercher et al. |
| 2003/0137309 A1 | 7/2003 | Itimura et al. |
| 2004/0027749 A1 | 2/2004 | Zuercher et al. |
| 2005/0017731 A1 | 1/2005 | Zuercher et al. |
| 2006/0072256 A1 | 4/2006 | Miller et al. |
| 2006/0254355 A1 | 11/2006 | Zhou |
| 2008/0204950 A1* | 8/2008 | Zhou et al. .................... 361/42 |
| 2008/0204955 A1* | 8/2008 | Parker et al. .................. 361/87 |

* cited by examiner

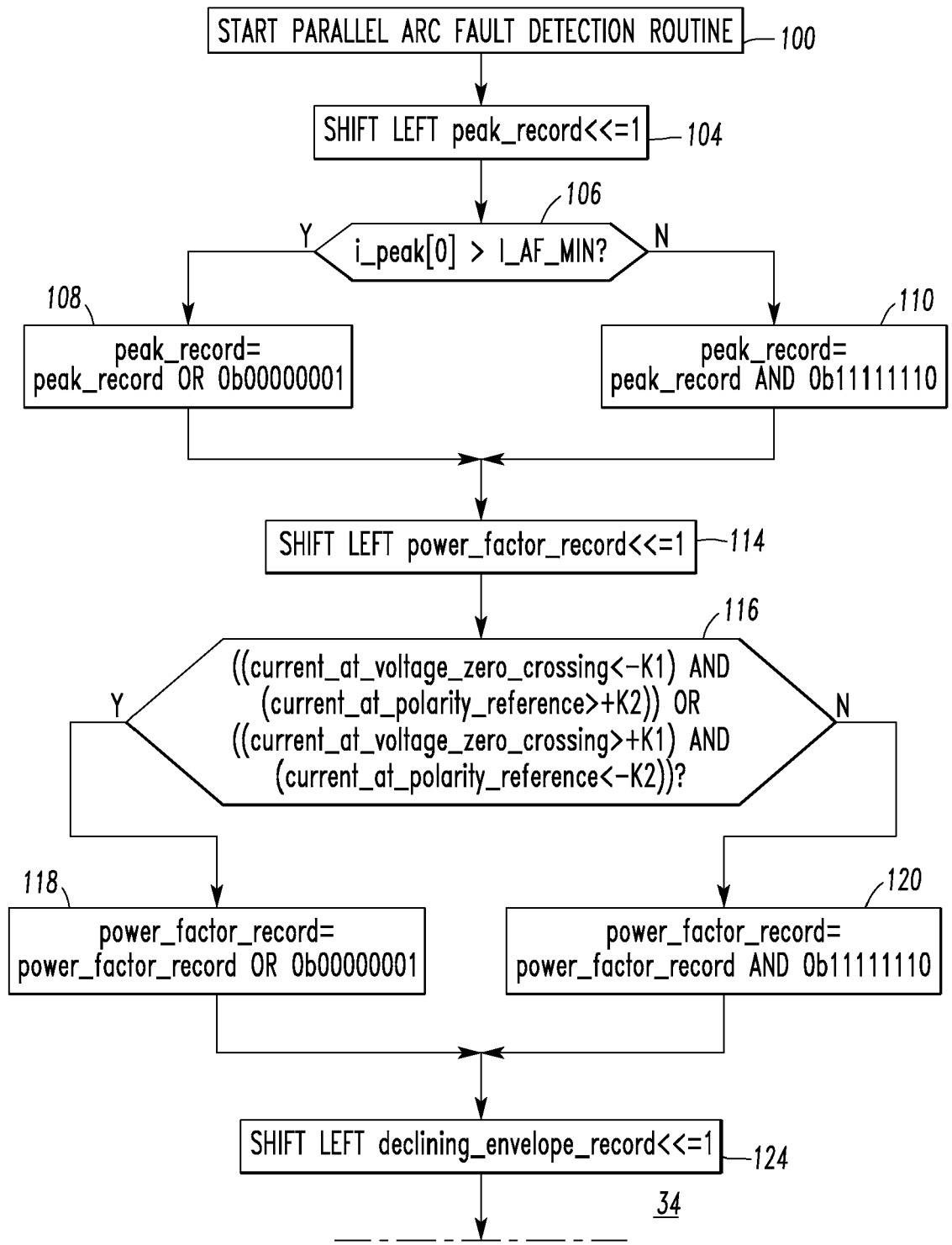
FIG.2A1

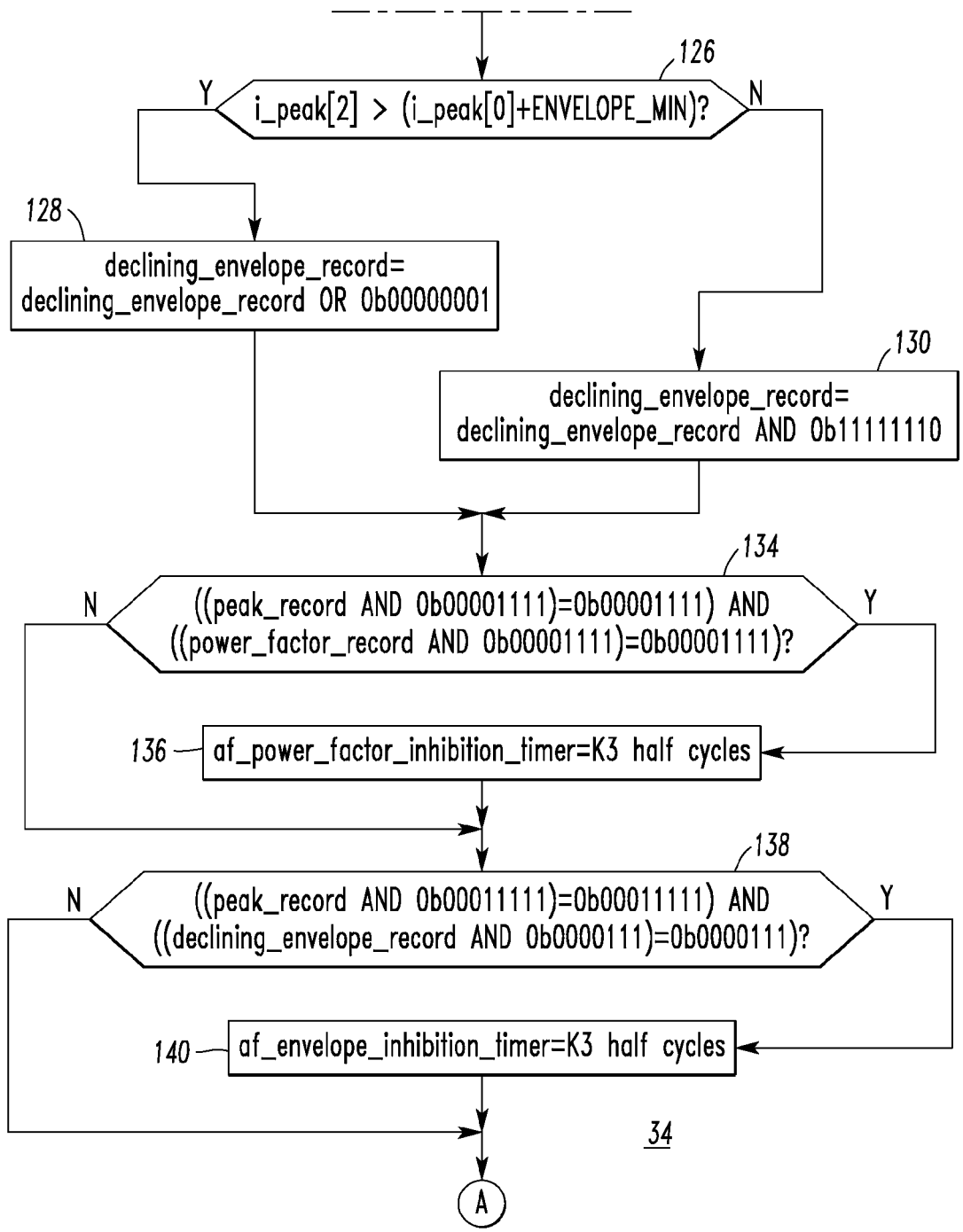
FIG.2A2

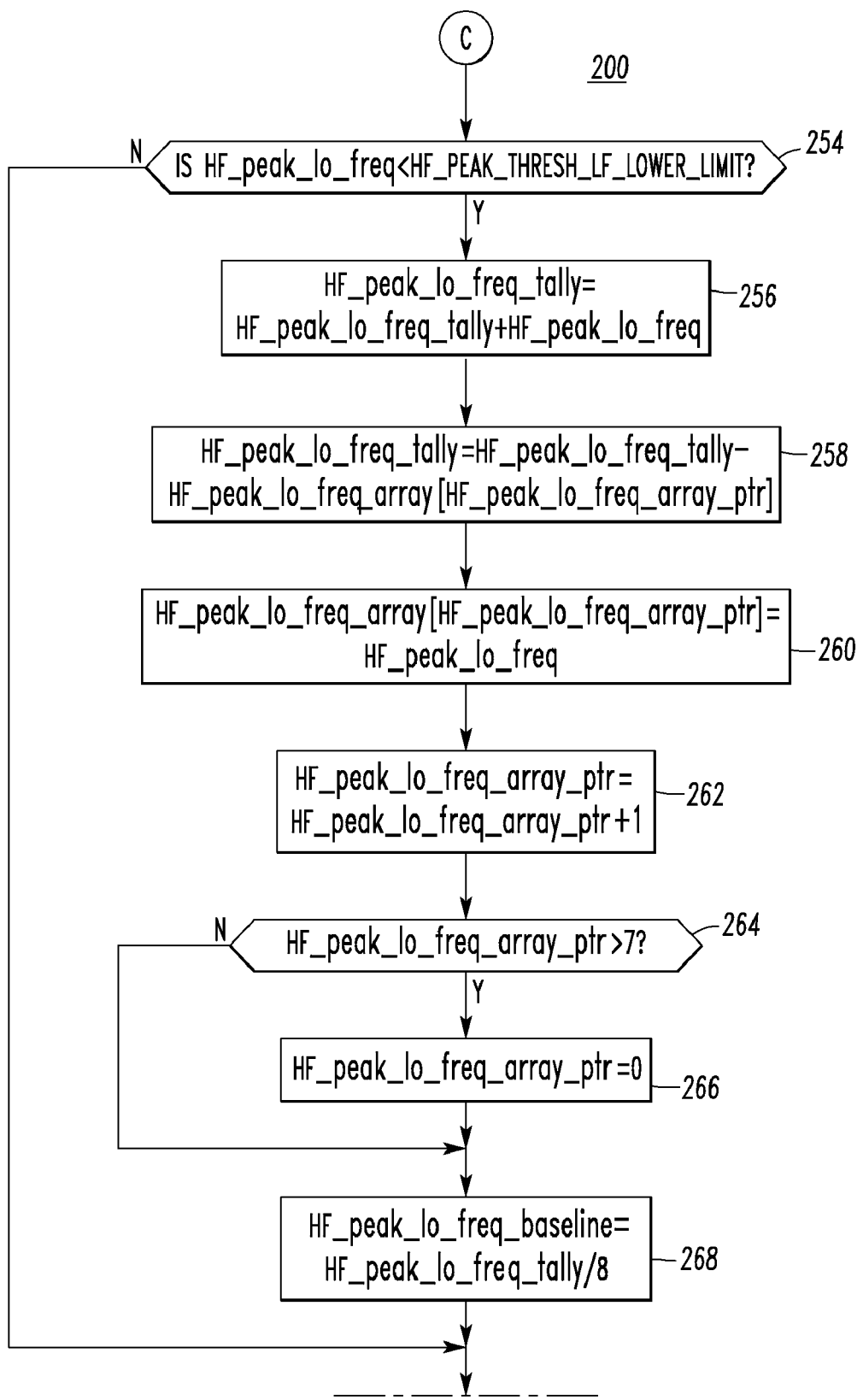
FIG.3C1

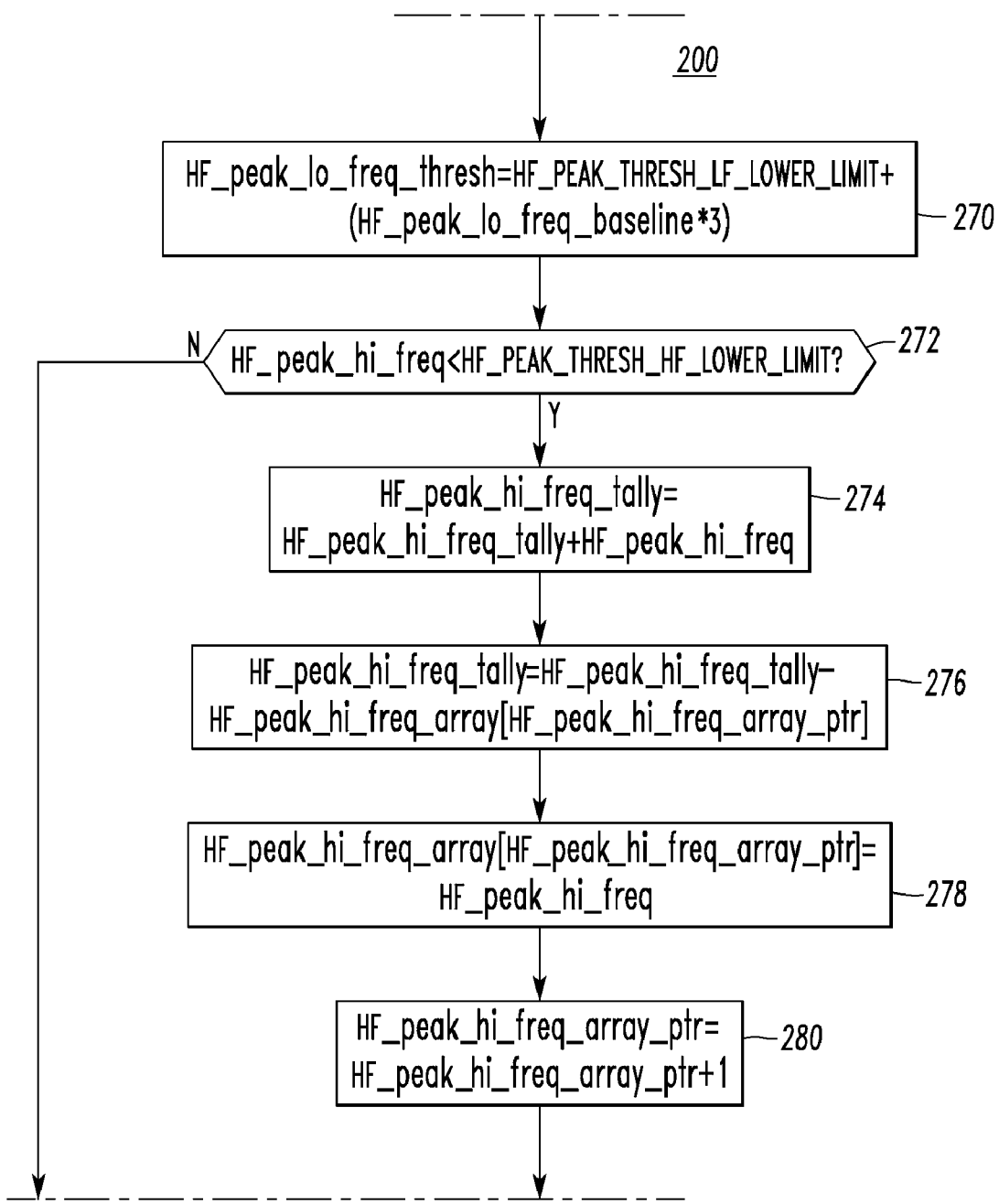
FIG. 3C2

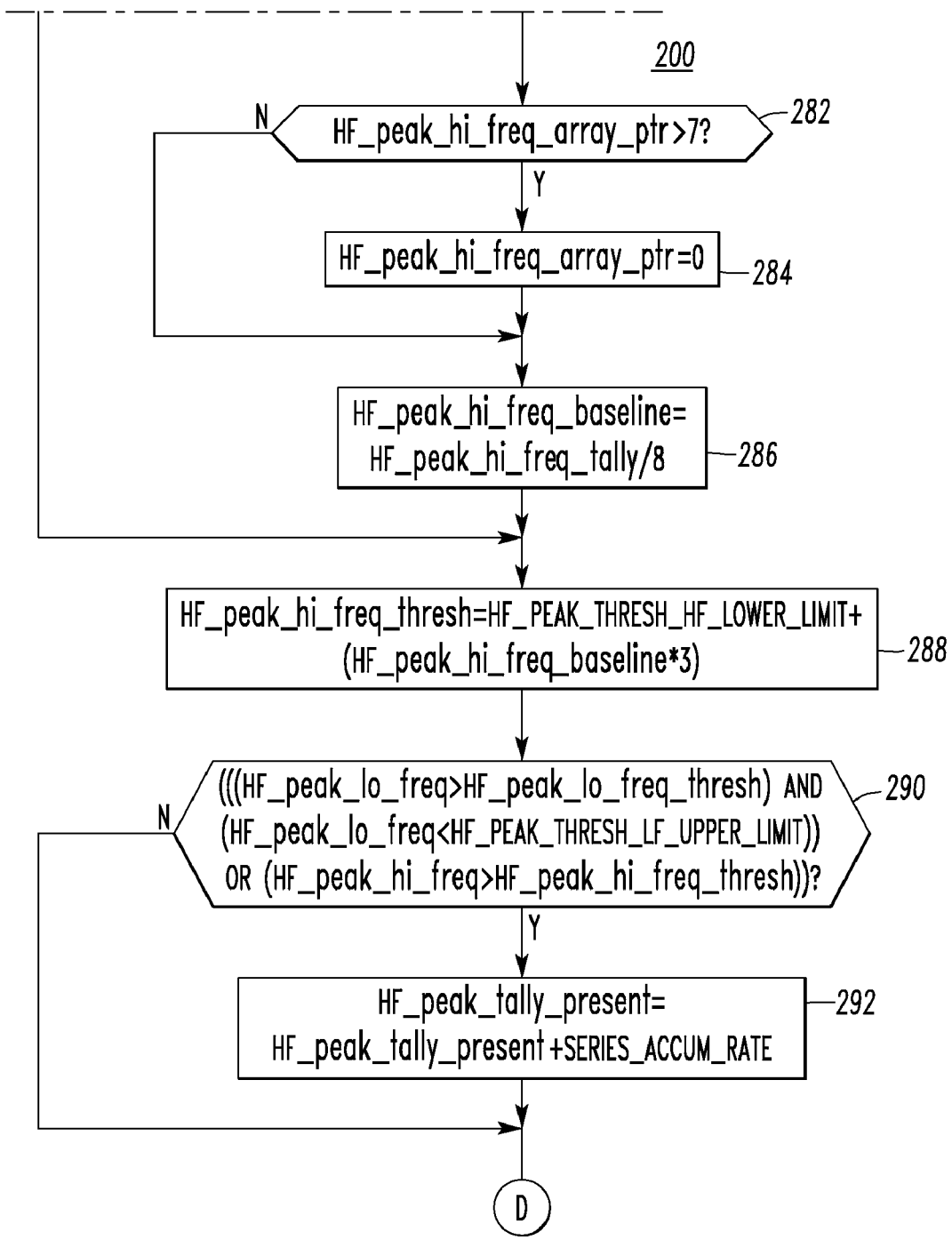
FIG.3C3

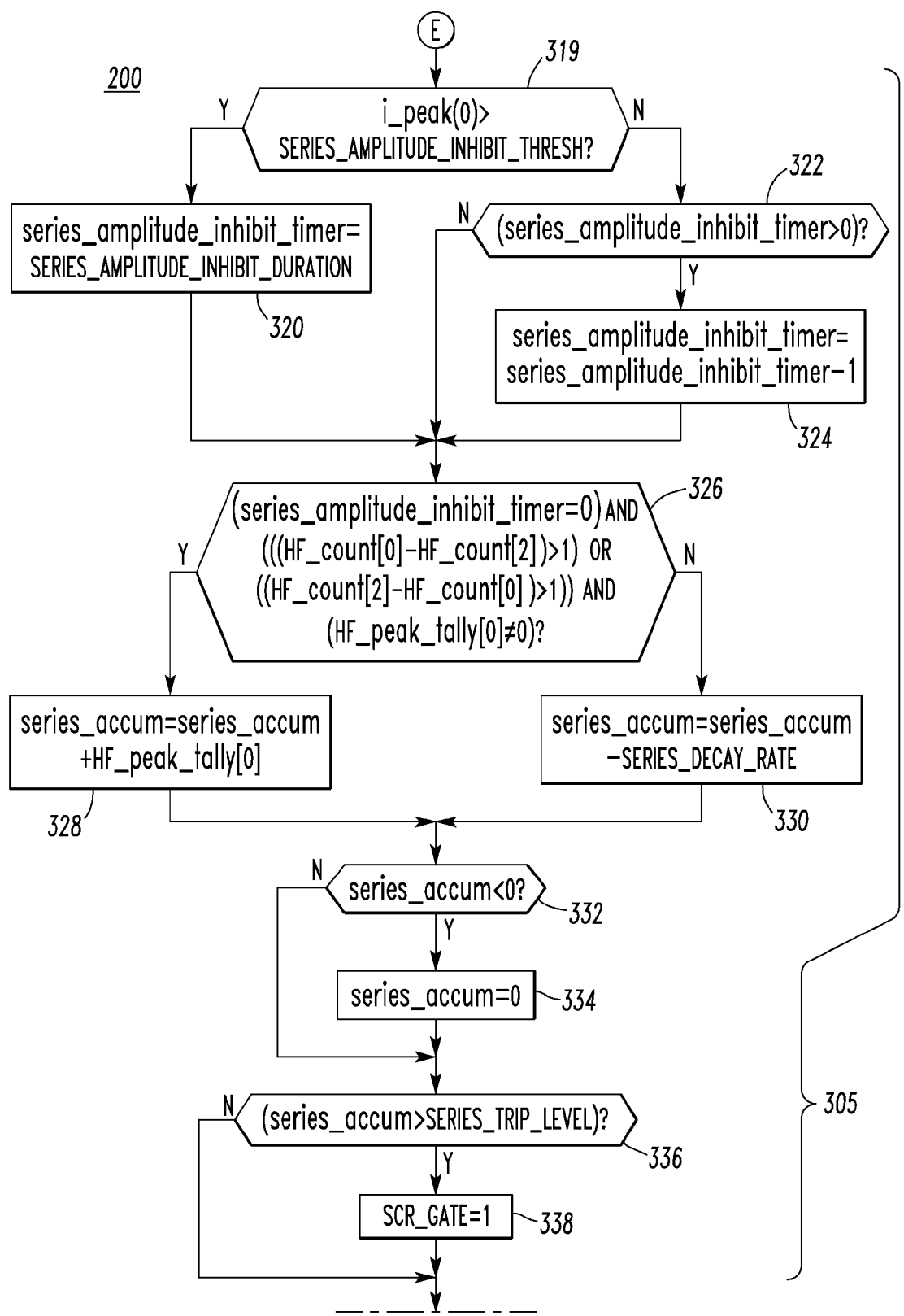
FIG.3E1

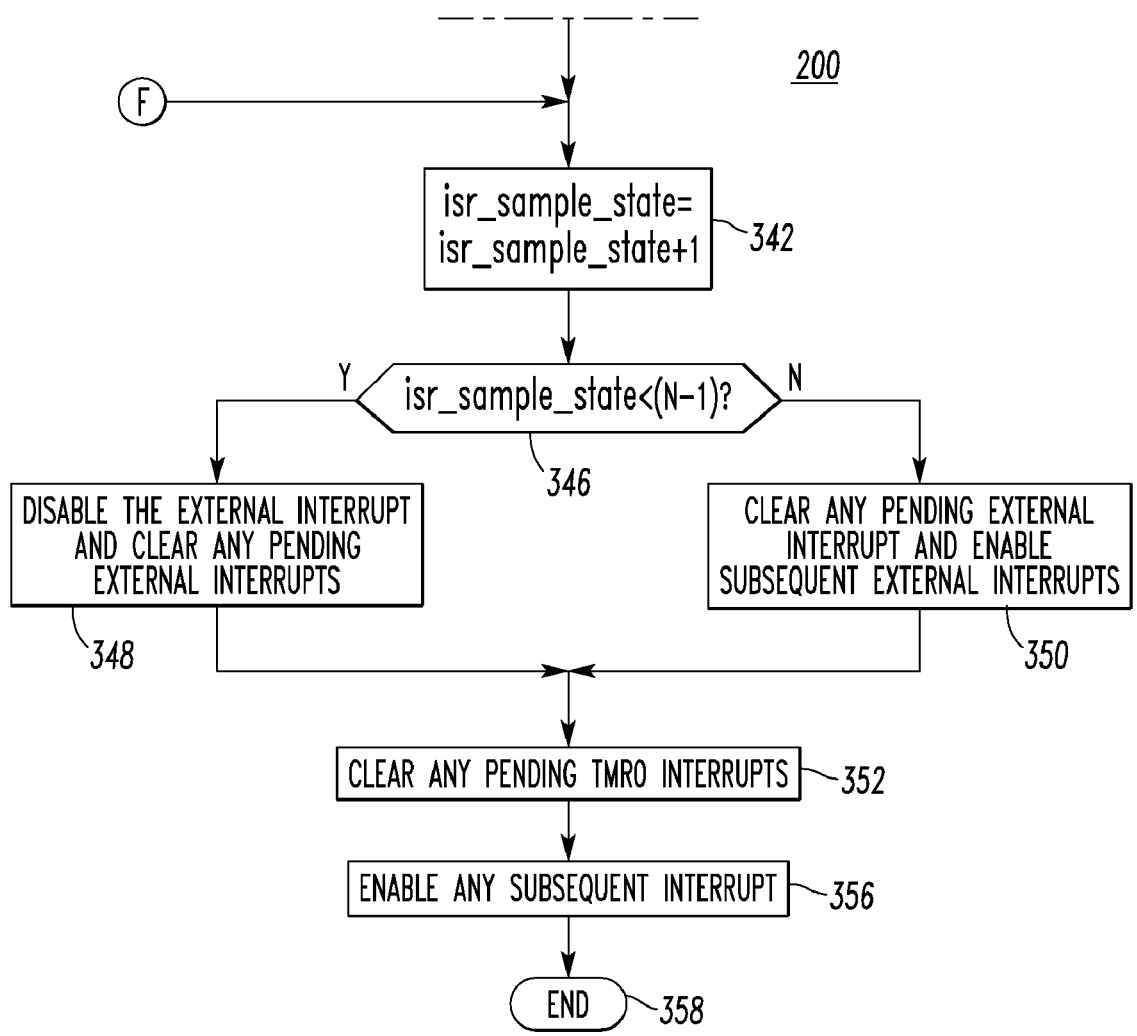
FIG.3E2

ARC FAULT CIRCUIT INTERRUPTER AND METHOD OF PARALLEL AND SERIES ARC FAULT DETECTION

CROSS-REFERENCE TO RELATED APPLICATIONS

This application is related to commonly assigned, concurrently filed:

U.S. patent application Ser. No. 11/679,298, filed Feb. 27, 2007, entitled "Arc Fault Circuit Interrupter And Series Arc Fault Detection Method Using Plural High Frequency Bands"; and U.S. patent application Ser. No. 11/679,299, filed Feb. 27, 2007, entitled "Arc Fault Circuit Interrupter And Method Of Parallel Arc Fault Detection".

BACKGROUND OF THE INVENTION

1. Field of the Invention

This invention pertains generally to circuit interrupters and, more particularly, to arc fault circuit interrupters. The invention also relates to methods of detecting series and parallel arc faults.

2. Background Information

Circuit breakers are used to protect electrical circuitry from damage due to an overcurrent condition, such as an overload condition or a relatively high level short circuit or fault condition. In small circuit breakers, commonly referred to as miniature circuit breakers, used for residential and light commercial applications, such protection is typically provided by a thermal-magnetic trip device. This trip device includes a bimetal, which heats and bends in response to a persistent overcurrent condition. The bimetal, in turn, unlatches a spring powered operating mechanism, which opens the separable contacts of the circuit breaker to interrupt current flow in the protected power system.

An arc fault circuit interrupter (AFCI) is a device intended to mitigate the effects of arc faults by functioning to deenergize an electrical circuit when an arc fault is detected. Non-limiting examples of AFCIs include: (1) arc fault circuit breakers; (2) branch/feeder arc fault circuit interrupters, which are intended to be installed at the origin of a branch circuit or feeder, such as a panelboard, and which may provide protection from series arc faults, ground faults and line-to-neutral faults up to the outlet; (3) outlet circuit arc fault circuit interrupters, which are intended to be installed at a branch circuit outlet, such as an outlet box, in order to provide protection of cord sets and power-supply cords connected to it (when provided with receptacle outlets) against the unwanted effects of arcing, and which may provide protection from series arc faults, line-to-ground faults and line-to-neutral faults; (4) cord arc fault circuit interrupters, which are intended to be connected to a receptacle outlet, in order to provide protection to an integral or separate power supply cord; (5) combination arc fault circuit interrupters, which function as either a branch/feeder or an outlet circuit AFCI; and (6) portable arc fault circuit interrupters, which are intended to be connected to a receptacle outlet and provided with one or more outlets.

During sporadic arc fault conditions, the overload capability of a conventional circuit breaker will not function since the root-mean-squared (RMS) value of the fault current is too small to activate the automatic magnetic trip circuit. The addition of electronic arc fault sensing to a circuit breaker can add one of the elements required for sputtering arc fault protection-ideally, the output of an electronic arc fault sensing circuit directly trips and, thus, opens the circuit breaker. See, for example, U.S. Pat. Nos. 6,710,688; 6,542,056; 6,522,509; 6,522,228; 5,691,869; and 5,224,006.

Arc faults can be series or parallel. Examples of a series arc are a broken wire where the ends of the broken wire are close enough to cause arcing, or a relatively poor electrical connection. Parallel arcs occur between conductors of different potential including, for example, a power conductor and a ground. Unlike a parallel arc fault, series arc faults do not usually create an increase in current since the fault is in series with the load. In fact, a series arc fault may result in a slight reduction in load current and not be detected by the normal overload and overcurrent protection of conventional protection devices. Even the parallel arc, which can draw current in excess of normal rated current in a circuit, produces currents which can be sporadic enough to yield RMS values less than that required to produce a thermal trip, or at least delay operation. Effects of the arc voltage and line impedance often prevent the parallel arc from reaching current levels sufficient to actuate the instantaneous trip function.

Known technology for arc fault detection typically utilizes a current signature at the fundamental frequency (e.g., 50 or 60 Hz) and other relatively low frequencies (e.g., below 100 kHz). A problem associated with this technology is that it highly depends on the electric loads that can sometimes generate false arc fault signatures at the fundamental frequency as well as at other relatively low frequencies.

U.S. Pat. No. 5,206,596 discloses an arc detector transducer including an electric field sensor sensing the electric field established about a conductor by the occurrence of an electrical arc in the circuit, and a magnetic field sensor sensing the magnetic field established about the conductor by the occurrence of the electrical arc. The sensors detect high frequency signals (preferred bands are from about 1 kHz to about 5 MHz) generated by the arc. A band pass filter having a wide band path from 100 kHz to 1 MHz is employed in order to try to identify a random chaotic pattern generated in response to the electromagnetic field established about the conductor due to the occurrence of the arc.

U.S. Pat. No. 5,729,145 discloses the detection of an arc fault by correlating the high frequency signal (10 kHz to 1 GHz) generated by the arc to the system voltage or current wave zero crossing or waveform phase angle. During the time the arc is conducting current, it produces wideband, high-frequency noise. During the time the arc is not conducting current, it produces no noise. The resulting characteristic pattern of high-frequency noise with synchronous gaps is unique to arcing. An algorithm analyzes repetitive patterns in the amplitude of the noise to detect arcing.

U.S. Pat. No. 6,414,829 discloses analyzing current waveforms and broadband noise to determine if arcing is present in electrical conductors. A high current arc is identified as a current waveform that has a combination of changes in current (di/dt) and broadband noise (10 kHz to 100 kHz). A broadband noise detector comprises first and second band-pass filter circuits, which receive the rate of change of current signal from a di/dt sensor. The band passes of these filter circuits are selected at frequency bands which are representative of broadband noise typical of arcing faults. The band-pass frequencies are selected as typically 35 kHz and 70 kHz. Each of the band-pass filter circuits feeds a filtered signal, comprising those components of an input signal from the di/dt sensor which fall within their respective band-pass frequency pass bands, to respective threshold detector circuits to determine if there is an arc fault. Nothing is disclosed regarding complete separation of the two frequency bands.

U.S. Pat. No. 7,110,864 discloses an amplitude-duration relationship for both arcing and non-arcing conditions. In a first zone, which is characterized by relatively short duration events, the events are recognized, discriminated and/or treated as likely representing high frequency noise. In a second, intermediate arc detection zone, those events having at least a predetermined minimum current amplitude are recognized and/or treated as likely representing either an arc fault condition or in-rush condition. In a third zone, which is characterized by relatively long duration events, the events are recognized, discriminated and/or treated as likely representing low-frequency noise and/or AC current.

UL 1699 ("Arc fault detection tests table" of Table 50.2 (Table 34.2)) defines, for example, parallel arc fault detection requirements ("Carbonized path arc interruption test" of Section 56.3, and "Point contact arc test" of Section 56.5), parallel arc fault nuisance trip requirements ("Unwanted tripping tests/Load condition I—inrush current" of Sections 57 and 57.2), series arc fault detection requirements ("Carbonized path arc clearing time test" of Section 56.4, "Masking" of the signal to operate of Sections 58 and 58.2, and "EMI filter" of Section 58.3), and series arc fault nuisance trip requirements (various "Unwanted tripping tests" of Sections 57 and 57.2 through 57.7).

A combination AFCI must not only interrupt a power circuit (e.g., trip) in response to parallel arc faults, but not in response to normal current transients that resemble parallel arc faults, but also, a combination AFCI must interrupt a power circuit in response to series arc faults, which occur on that power circuit, even when the series arc fault occurs in combination with other normally operating loads. Such combination AFCIs should also not "nuisance trip" or unnecessarily trip in response to normal, non-hazardous electrical load conditions.

There is room for improvement in arc fault circuit interrupters.

There is also room for improvement in methods of detecting series and parallel arc faults.

SUMMARY OF THE INVENTION

These needs and others are met by embodiments of the invention, which combine both low current series arc fault detection using the high frequency current "noise" associated with series arc faults and high current parallel arc fault detection using a fundamental current waveform associated with parallel arc faults. This reliably detects and responds to low current series arcs as well as high current parallel arcs.

In accordance with one aspect of the invention, an arc fault circuit interrupter comprises: separable contacts; a neutral conductor; an operating mechanism structured to open and close the separable contacts; at least one current sensor structured to sense current flowing through the separable contacts and output a sensed current value; and a processor comprising a first routine structured to provide parallel arc fault detection, a second routine structured to provide series arc fault detection, and a third routine structured to enable the first routine and disable the second routine when the sensed current value is greater than a predetermined value and to enable the second routine and disable the first routine when the sensed current value is less than the predetermined value.

As another aspect of the invention, an arc fault circuit interrupter for an alternating current power circuit including a plurality of half-cycles comprises: separable contacts; an operating mechanism structured to open and close the separable contacts; at least one current sensor structured to sense current flowing through the separable contacts and output a sensed current value; a processor comprising a first routine structured to provide parallel arc fault detection, a second routine structured to provide series arc fault detection, and a third routine structured to enable the first routine and disable the second routine when the sensed current value is greater than a first predetermined value and to enable the second routine and disable the first routine when the sensed current value is less than the first predetermined value; a first band pass filter cooperating with one of the at least one current sensor to output a first pass band having a first range of frequencies of the sensed current; a second band pass filter cooperating with one of the at least one current sensor to output a second pass band having a second range of frequencies of the sensed current, the second range of frequencies not overlapping and being greater than the first range of frequencies; a first peak detector cooperating with the first band pass filter to detect a plurality of first peak current values from the first pass band; a second peak detector cooperating with the second band pass filter to detect a plurality of second peak current values from the second pass band; a first envelope detector cooperating with the first band pass filter to detect a plurality of first occurrences from the first pass band being within a first predetermined range of magnitudes; a second envelope detector cooperating with the second band pass filter to detect a plurality of second occurrences from the second pass band being within a second predetermined range of magnitudes; and a counter structured to count the first and second occurrences, wherein the second routine is further structured to disable the series arc detection when the sensed current is greater than a second predetermined value, wherein the processor cooperates with the counter to determine a plurality of counts from the counter for the half-cycles, wherein the processor further cooperates with the first and second peak detectors to determine a plurality of tallies responsive to one of the first peak current values exceeding a first threshold for the half-cycles or one of the second peak current values exceeding a second threshold for the half-cycles, wherein the processor is structured to determine presence of series arcing in the power circuit from: (1) the sensed current being less than the second predetermined value for at least a predetermined time, (2) the tally for a current one of the half-cycles being not zero, and (3) the count of the counter for the current one of the half-cycles being different than the count of the counter for an immediately previous one of the half-cycles of like polarity by at least a third predetermined value, and wherein the processor is further structured to increase a series chaos accumulator responsive to the presence of series arcing.

As another aspect of the invention, a method of detecting parallel arc faults or series arc faults for an alternating current power circuit comprises: sensing current flowing through the alternating current power circuit and outputting a sensed current value; providing parallel arc fault detection; providing series arc fault detection; enabling the parallel arc fault detection and disabling the series arc fault detection for a predetermined time when the sensed current value is greater than a predetermined value; and otherwise, enabling the series arc fault detection and disabling the parallel arc fault detection for a predetermined time when the sensed current value is less than the predetermined value.

BRIEF DESCRIPTION OF THE DRAWINGS

A full understanding of the invention can be gained from the following description of the preferred embodiments when read in conjunction with the accompanying drawings in which:

FIGS. 2A1-2A2 and 2B form a flowchart of a parallel arc fault detection routine executed by the processor of FIG. 1.

FIGS. 3A, 3B, 3C1-3C3, 3D and 3E1-3E2 form a flowchart of a series arc fault detection routine executed by the processor of FIG. 1.

DESCRIPTION OF THE PREFERRED EMBODIMENTS

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "number" shall mean one or an integer greater than one (i.e., a plurality).

As employed herein, the term "current sensor" shall mean a current transformer or any suitable sensor for sensing current flowing through a conductor.

The invention is described in association with a miniature circuit breaker, although the invention is applicable to a wide range of arc fault circuit interrupters.

Figure 1:
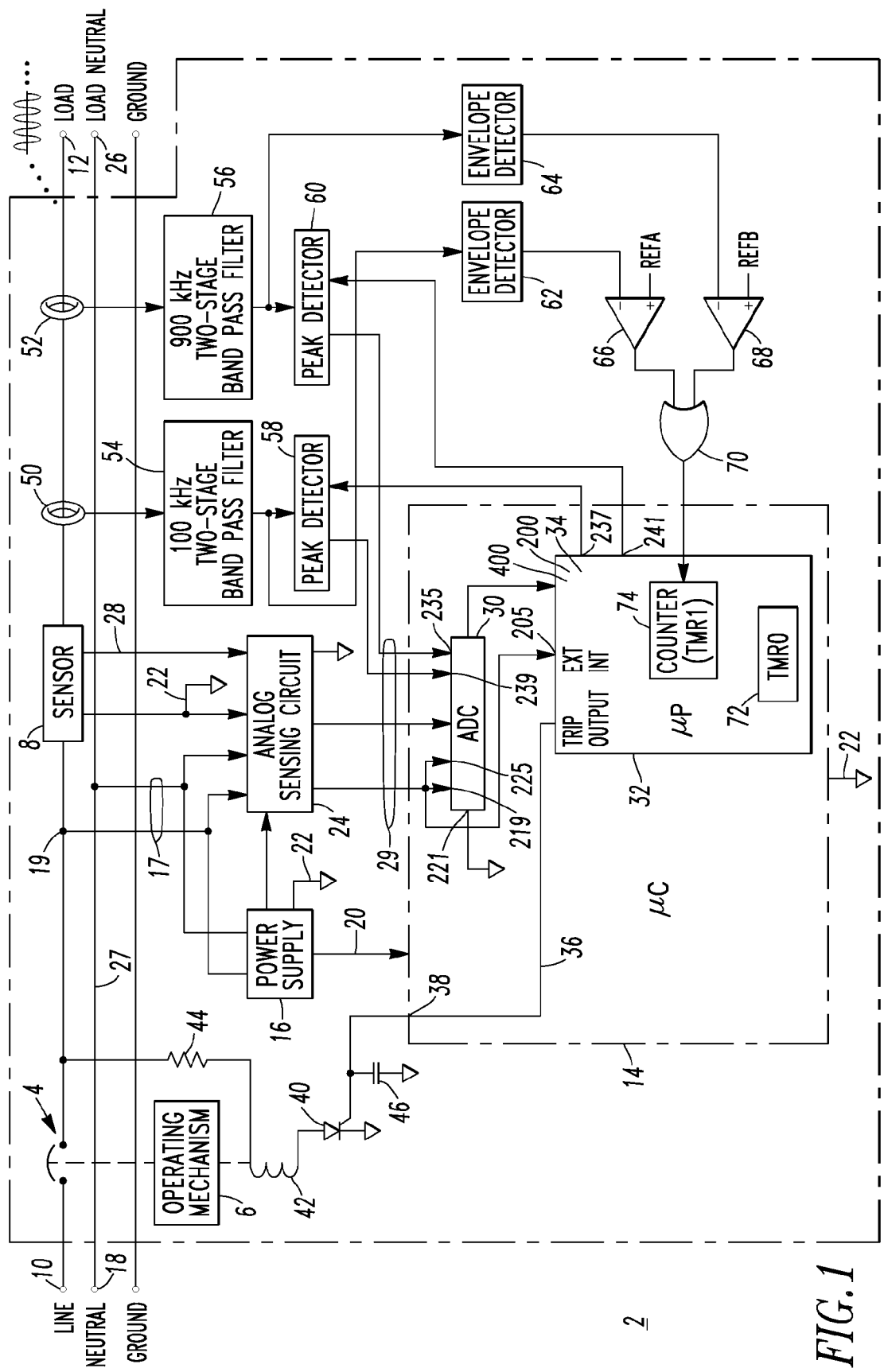
FIG. 1 is a block diagram in schematic form of a circuit breaker including a processor in accordance with an embodiment of the invention.

Referring to FIG. 1, a miniature circuit breaker 2 includes separable contacts 4, an operating mechanism 6 structured to open and close the separable contacts 4, and a sensor 8 structured to sense current flowing through the separable contacts 4 between a line terminal 10 and a load terminal 12. The circuit breaker 2 also includes a processor, such as the example microcomputer (μC) 14 (e.g., without limitation, a Microchip PIC16F685 microcontroller, marketed by Microchip Technology Incorporated of Chandler, Ariz.), cooperating with the sensor 8 and the operating mechanism 6 to trip open the separable contacts 4, and a power supply 16 structured to at least power the μC 14. The power supply 16 is, for example, an alternating current (AC) to direct current (DC) (AC/DC) power supply which receives a line-to-neutral voltage 17 between a neutral terminal 18 and a conductor 19 that is electrically connected downstream of the separable contacts 4 and to or toward the load terminal 12. The AC/DC power supply 16 provides a suitable DC voltage 20 and a common 22 to the μC 14 and, as needed, powers, for example, an analog sensing circuit 24.

The analog sensing circuit 24 receives inputs of the line-to-neutral voltage 17, as referenced to the neutral terminal 18, a load neutral terminal 26 and a neutral conductor 27, and a voltage 28 representative of the load current (e.g., without limitation, the line current flowing through the current sensor 8). Various input voltage signals 29 from, for example, the analog sensing circuit 24 are input by a plural channel analog-to-digital converter (ADC) 30 of the μC 14 and are converted to corresponding digital values for input by μP 32. The μP 32 includes a parallel arc fault detection routine 34, a series arc fault detection routine 200, and a parallel/series arc fault detection routine 400, as will be explained.

Responsive to one or more conditions as sensed from the ADC input voltage signals 29, the μP 32 generates a trip signal 36 that passes through the μC 14 to output 38 and turns SCR 40 on. The SCR 40, in turn, energizes a trip solenoid 42 and, thereby, actuates the operating mechanism 6 to trip open the separable contacts 4 in response to, for example, an over-voltage, an arc fault or other trip condition. The trip solenoid 42 is, thus, a trip actuator cooperating with the μP 32 and the operating mechanism 6 to trip open the separable contacts 4 responsive to one of the different trip conditions detected by the μP 32. A resistor 44 in series with the coil of the solenoid 42 limits the coil current and a capacitor 46 protects the gate of the SCR 40 from voltage spikes and false tripping due to noise.

As an equivalent alternative to the example, as shown, the resistor 44 may be electrically connected to the neutral conductor 27, with the conductor 19 being electrically connected to the common reference node 22.

In this example, three current sensors are shown: sensor 8 and two current transformers (CTs) 50,52, although one, two or three current sensors may be employed. Hence, one current sensor may feed the analog sensing circuit 24 and the two bandpass filters 54,56. As another example, the two CTs 50,52 not only measure the two high frequency signals from the sensed current, but also measure the power frequency signal from the sensed current. The CTs 50,52 sense di/dt and their outputs are integrated over a finite time period to obtain the current signal. Here, two CTs are employed to optimize the outputs in the desired frequency ranges, in order that significant amplification of the CTs' outputs is avoided.

Although not shown, the current sensor 8 may equivalently sense the current flowing through the neutral conductor 27.

The outputs of the CTs 50 and 52 are input by an example 100 kHz two-stage band pass filter 54 and an example 900 kHz two-stage band pass filter 56, respectively. A non-limiting example of the first range of frequencies of the first band pass filter 54 is about 100 kHz+/−3.125 kHz (center frequency to bandwidth ratio (Q) of about 16). A non-limiting example of the second range of frequencies of the second band pass filter 56 is about 900 kHz+/−28.125 kHz (Q of about 16). Preferably, each of the first and second band pass filters 54,56 have a center frequency to bandwidth ratio (Q) of greater than about 5.

The outputs of the filters 54 and 56 are input by a first peak detector 58 and a second peak detector 60, and by a first envelope detector 62 and a second envelope detector 64, respectively. The outputs of the peak detectors 58 and 60 are input by respective input channels 239 and 235 of the ADC 30. The outputs of the envelope detectors 62 and 64 are input by the negative inputs of first comparator 66 and second comparator 68, respectively. Those comparators 66,68 use respective references REFA,REFB at their positive inputs. The outputs of the comparators 66,68 are input by OR gate 70 the output of which is input by a counter (TMR1) 74 of μP 32. The μP 32 also includes a timer (TMR0) 72, as will be discussed.

Plural (e.g., two or more) high frequency, relatively narrow bands of the corresponding band pass filters 54,56 are completely separated and do not overlap. As will be discussed, the peak detector outputs of these high frequency signals above predefined thresholds are either 'OR'ed or 'AND'ed to determine if there is an arc fault. This is important since a relatively narrow band of high frequency signal is desired in order to minimize high frequency noise generated by a normal load. Also, the two relatively narrow bands of high frequencies need to be separated far enough, in order that they do not duplicate information as well as provide high frequency information generated by arcs in various electrical circuits. The high frequency current signals that are input by the corresponding ADC channels 235,239 are employed to detect arc faults. The plural frequency bands are separated apart enough to capture the high frequency signatures generated by arcs based on high frequency signal peak detection. This takes into account the high frequency signature noise generated by the arc, while eliminating signal noises generated by the load (not shown, but electrically connected to the terminals 12 and 26) in certain frequency bands as well as overcoming the impact caused by signal strength attenuation due to loads with capacitive impedance in the circuit, such as EMI filters (e.g., without limitation, Corcom® filters) (not shown).

When a capacitive load (not shown) is connected in parallel to the power circuit (not shown) downstream of the AFCI circuit breaker 2, a signal at relatively higher frequencies, such as 900 kHz, generated by an arc fault (not shown) in that power circuit may be shunted through the capacitor (not shown) in the capacitive load rather than going through the AFCI circuit breaker 2 and the corresponding CT 52 and band pass filter 56 due to the impedance difference between the capacitive load and the line power circuit where the AFCI circuit breaker 2 is located. Meanwhile, a signal at a relatively lower frequency, such as 100 kHz, is less affected and there is still a detectable signal going through the corresponding band pass filter 54.

The band pass filters 54,56 may cover corresponding ranges that are centered from about 50 kHz up to about 2 MHz. The outputs of these relatively narrow band pass filters 54,56 of corresponding high frequency (as detected through the corresponding peak detectors 58,60) are "OR"ed by the OR gate 70 to detect if there is an arc. The first envelope detector 62 cooperates with the first band pass filter 54 to detect a plurality of first occurrences from that first pass band being within a first predetermined range of magnitudes (e.g., without limitation, about 2.652 V and higher). The second envelope detector 64 cooperates with the second band pass filter 56 to detect a plurality of second occurrences from that second pass band being within a second predetermined range of magnitudes (e.g., without limitation, about 2.756 V and higher). A suitable high frequency pulse counter (TMR1) 74 is employed to eliminate repetitive signals from certain loads. Moving average baselines (268 and 286 of FIGS. 3C1 and 3C3, respectively) are employed to eliminate "good arcs" in certain loads, such as certain chop saws.

EXAMPLE 1

The disclosed parallel arc fault detection routine 34 ignores any line current pulses with a peak amplitude less than a predetermined amount (e.g., without limitation, about 50 A peak). If four half-cycles of line current with non-unity power factor occur in succession, then arc fault detection is inhibited for a predetermined time (e.g., without limitation, about 0.3 seconds). For example, this can distinguish a motor (e.g., without limitation, chop saw; air compressor motor) start inrush current transient from a parallel arc fault. If at least three half-cycles of line current with a continuously decreasing peak amplitude occur in succession (or in successive line cycles of like polarity), then the routine 34 inhibits arc fault detection for a predetermined time (e.g., without limitation, about 0.3 seconds). For example, this can distinguish an incandescent dimmer inrush current from a parallel arc fault. Otherwise, if the previous three conditions are not met, then any half-cycle of current with a peak amplitude greater than the predetermined amount (e.g., without limitation, about 50 A peak) is assumed to be a parallel arc. If about five to about seven such arcing half-cycles occur, which are each separated from one another by no more than a predetermined time (e.g., without limitation, 0.5 seconds), then a parallel arc fault is identified.

EXAMPLE 2

Referring to FIGS. 2A1-2A2 and 2B, the parallel arc fault detection routine 34 is shown. The routine 34 starts at 100 after which even steps 104-110 process peak current inhibition conditions and keep a record of whether recent AC line half-cycles have a peak current magnitude (i.e., absolute value) (i_peak) that is greater than a predetermined minimum arc fault peak current (I_AF_MIN) (e.g., without limitation, 50 A peak; any suitable current value which is considered to correspond to a potential parallel arc fault). At 104, the bits in peak_record are shifted left by one position. Then, at 106, it is determined if the most recent peak current magnitude (i.e., absolute value) (i_peak[0]) is greater than the predetermined minimum arc fault peak current. If so, then at 108, the lowest order bit in peak_record is set. Otherwise, at 110, the lowest order bit in peak_record is cleared.

After either 108 or 110, even steps 114-120 use AC (e.g., without limitation, 60 Hz) current information to detect non-unity power factor. At 114, the bits in power_factor_record are shifted left by one position. Then, at 116, it is determined if the signed (i.e., positive or negative) line current at the voltage zero crossing (current_at_voltage_zero_crossing) was a different polarity than what the current is, for example, 90° later, at a suitable signed (i.e., positive or negative) polarity reference (current_at_polarity_reference). For example, the line current at the voltage zero crossing may be measured in response to a microcomputer interrupt initiated in response to the zero crossing of the line-to-neutral voltage 17, and the line current at the polarity reference may be measured in response to a microcomputer timer interrupt that is preset to occur a suitable time after the previous zero crossing interrupt. In step 116, K1 and K2 are predetermined constant current values of, for example and without limitation, 2 A and 10 A, respectively. If the test at 116 passes, then at 118, the lowest order bit in power_factor record is set, since there is non-unity power factor for the most recent half-cycle. Otherwise, at 120, the lowest order bit in power_factor_record is cleared, since there is unity power factor for the current half-cycle.

Even steps 124-130 use AC current information to detect a continuously declining pattern of peak current. At 124, the bits in declining_envelope_record are shifted left by one position. Then, at 126, it is determined if the peak line current of the previous half-cycle of the same polarity (i_peak[2]) is greater than the most recent peak current (i_peak[0]) plus a predetermined minimum envelope value (ENVELOPE_MIN) (e.g., without limitation, 1 A; any suitable minimum value). Here, the peak line current of the immediately previous half-cycle of the opposite polarity is i_peak[1]. Step 126 determines if the most recent peak current (i_peak[0]) is sufficiently less than the peak line current of the previous half-cycle of the same polarity (i_peak[2]). If so, then at 128, the lowest order bit in declining_envelope_record is set. Otherwise, at 130, the lowest order bit in declining_envelope_record is cleared.

Next, even steps 134-140 process arc fault inhibition conditions. First, at 134, it is determined if the peak current has exceeded the predetermined minimum arc fault current for each of the last four half-cycles, and if the load has also exhibited a non-unity power factor for each of those last four half-cycles. If so, then at 136, an arc fault power factor inhibition timer (af_powerfactor_inhibition_timer) is set to a suitable count of half-cycles (e.g., without limitation, K3=36 half-cycles or 0.3 seconds). Next, at 138, which occurs after 136 or after the failure of the test at 134, it is determined if the peak current has exceeded the predetermined minimum arc fault current for each of the last about five to about seven half-cycles, and if the load has also exhibited a declining envelope for each of the last at least three half-cycles. If so, then at 140, an arc fault envelope inhibition timer (af_envelope_inhibition_timer) is set to a suitable count of half-cycles.

Figure 2B:
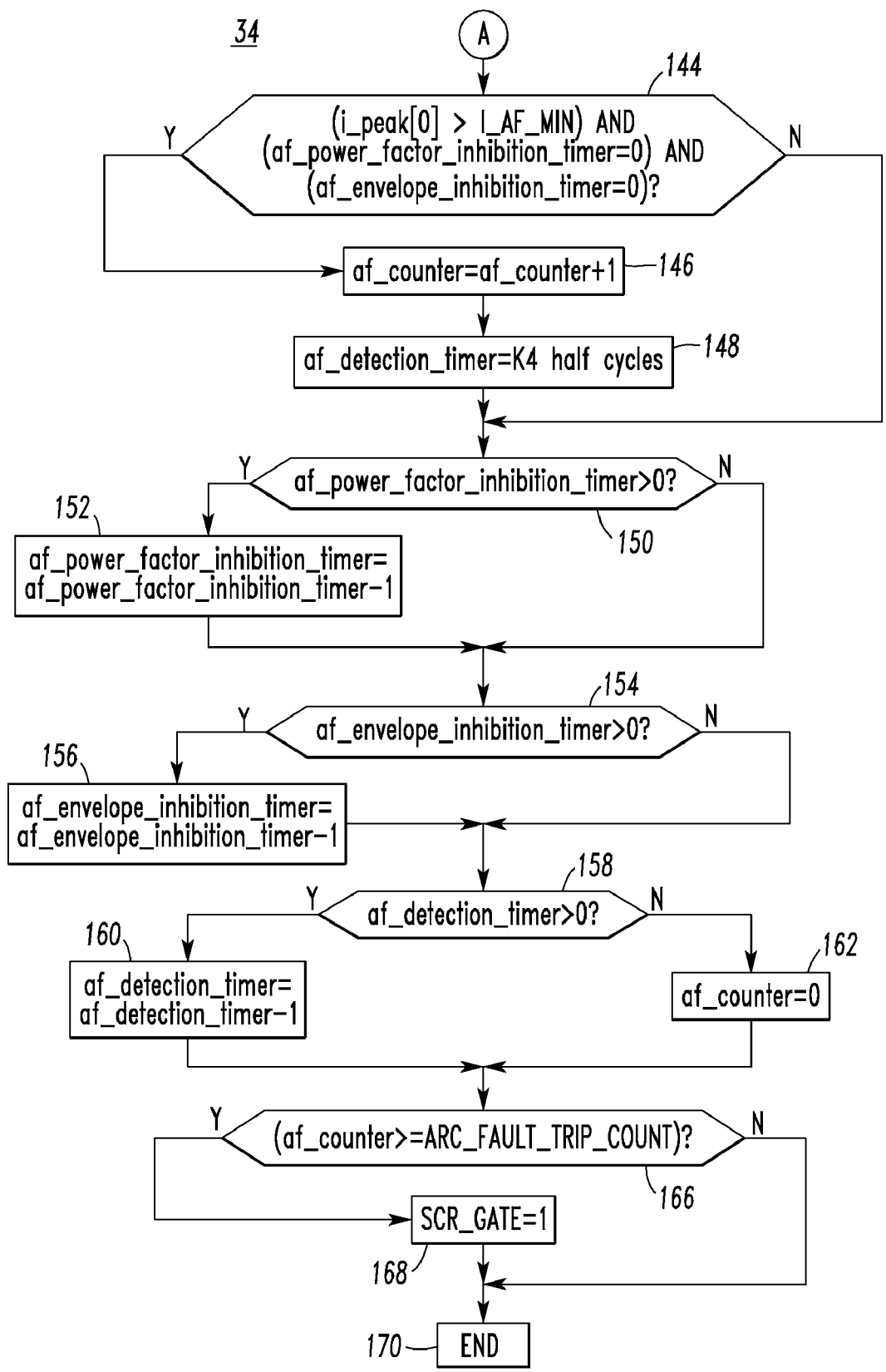

Next, at even steps 144 and 146 of FIG. 2B, which occur after 140 or after the failure of the test at 138, if the parallel arc fault detection routine 34 has not been inhibited (e.g., by the timers of steps 136 and 140 of FIG. 2A2), then any peak current of sufficient amplitude is accumulated. Step 144 determines if the most recent peak current (i_peak[0]) of the present half-cycle of current is considered to be a parallel arc of sufficient magnitude. If not, then execution resumes at 150. On the other hand, if there is a parallel arc of sufficient magnitude, then at 146, the arc fault tally (af_counter) is incremented. Next, at 148, an arc fault detection timer (af_detection_timer) is set to a suitable count of half-cycles (e.g., without limitation, K4=60 half-cycles or 0.5 seconds). Then, at 150, it is determined if the power factor inhibition timer is active. If so, then at 152, the power factor inhibition timer is decremented. After 152, or if the test at 150 failed, at 154, it is determined if the envelope inhibition timer is active. If so, then at 156, the envelope inhibition timer is decremented. After 156, or if the test at 154 failed, at 158, it is determined if the arc fault detection timer is active. If so, then at 160, the arc fault detection timer is decremented. Otherwise, at 162, the arc fault tally is cleared. After either 160 or 162, even steps 166 and 168 are employed to trip the circuit breaker 2 in response to a dangerous condition. Step 166 determines if a parallel arc fault has occurred by checking whether the arc fault tally of 146 is greater than or equal to a suitable predetermined value (ARC_FAULT_TRIP_COUNT) (e.g., without limitation, about 5; any suitable value). If so, then at 168, the circuit breaker 2 is tripped by setting the output 38 (SCR_GATE) true. After 168, or if the test at 166 failed, the routine 34 ends for the present half-cycle at 170.

The routine 34 is executed for each half-cycle of the line voltage. Hence, the µP 32 and the routine 34 cooperate with the current sensor 8 to determine and store a peak value (i_peak[n]) of the sensed current value 28 for a plurality of half-cycles of the line current, wherein n is an integer that ranges, in this example, from 0 to at least about 4.

Prior to the first running of the routine 34, the variables peak_record, i_peak, power_factor_record, declining_envelope_record and af_counter, and the timers af_power_factor_inhibition_timer, af_envelope_inhibition_timer and af_detection_timer are zeroed. In the disclosed embodiment, the timers or counters of steps 136, 140 and 148 are variables, although actual software and/or hardware timers or counters may be employed.

EXAMPLE 3

Step 126 of FIG. 2A2 is suitable regardless whether the sensor 8 of FIG. 1 is immune or susceptible to certain offset errors in sensing the peak line current (i_peak). For example, if the sensor 8 is a resistive current sensor, then the circuit 24 and ADC 30 are relatively immune to offset errors. However, if the sensor 8 is a Rogowski coil or other di/dt current sensor and the circuit 24 provides an integrator, then the ADC 30 may be susceptible to offset errors. Step 126 determines if the most recent peak current (i_peak[0]) is sufficiently less than the peak line current of the previous half-cycle of the same polarity (i_peak[2]). Here, those two peak currents of the same polarity have the same offset of the same polarity. Hence, the offset is not a problem.

Alternatively, when the sensor 8, circuit 24 and ADC 30 are relatively immune to offset errors, step 126 may determine if the most recent peak current (i_peak[0]) is sufficiently less than the peak line current of the immediately preceding half-cycle of differing polarity (i_peak[1]).

EXAMPLE 4

As an alternative to step 116, non-unity power factor may be determined if the signed (i.e., positive or negative) line current at the voltage zero crossing (current_at_voltage_zero_crossing) was a different polarity than what the line-to-neutral voltage 17 is, for example, 90° later, at a suitable signed (i.e., positive or negative) polarity reference (voltage_at_polarity_reference). In both step 116 and this Example 4, the determination of non-unity power factor is assumed to be indicative of normal operation and not of parallel arcing.

The disclosed method for detecting parallel arc faults is believed to be highly reliable and ideally suited for implementation by, for example, low-cost microcontrollers.

EXAMPLE 5

Certain loads generate high frequency noise that has significantly high moving average baselines, especially during their start up. In order to eliminate nuisance tripping caused by these types of loads, series arc detection is preferably disabled for a predetermined time (e.g., without limitation, 1 second) if the first moving average or the second moving average is greater than a predetermined value (e.g., without limitation, for a chop saw, the moving average goes up significantly; the predetermined values for the first and second moving averages can be 160 and 140, respectively).

EXAMPLE 6

Line cycle (e.g., 60 Hz) wave shape information is preferably employed to provide adequate trip response to clearing time tests. This means that the trip response should be based on the load (e.g., 60 Hz) current waveform (not just the current peak value, but rather the rms value since some loads, such as a dimmer, may have a relatively high peak current value, but a relatively small rms value) and the required tripping time at different current levels in UL 1699. This checks the rms current value or the average rms current value of several cycles and finds the required tripping time. If the series chaos accumulator (series_accum of step 328 of FIG. 3E1) is greater than a suitable trip threshold (e.g., without limitation, the tripping bucket level of 300 counts) before the required tripping time (e.g., without limitation, 1 second at 5 $A_{RMS}$), then wait without tripping the circuit breaker 2 until a predefined time (e.g., without limitation, 100 mS for this example) before the required tripping time. If during this waiting period, an arc fault signal continues to be detected, then trip the circuit breaker 2. Otherwise, do not trip the circuit breaker 2 and reset the series chaos accumulator to zero.

No "point-on-wave" approach or load identification method is employed.

Referring to FIGS. 3A, 3B, 3C1-3C3, 3D and 3E1-3E2, the series arc fault detection routine 200 is shown. At 202 of FIG. 3A, the routine 200 starts. Next, at 204, interrupts are processed. These interrupts include an internal timer interrupt (from TMR0 72) of the μC 14 of FIG. 1, as will be explained, and an external μC interrupt 205 that is responsive to voltage zero crossings of the line-to-neutral voltage 17. Step 204 ensures that the external interrupt 205 is enabled and pending, disables the external interrupt, and clears the pending interrupt in a manner well known to those skilled in the art. If any spurious external μC interrupt is detected, then the routine 200 is bypassed until step 356 of FIG. 3E2. After 204, at 206, a counter (isr_sample_state) that keeps track of current samples is cleared. Next, at 208, it is determined if all N (e.g., without limitation, N=8 samples; any suitable count of samples) current samples have been collected. Here, the "N" is employed to count the number of interrupts per half-cycle of the source voltage. If not, then at 210, the next TMR0 interrupt is set up to occur. At 212, any pending TMR0 interrupt is cleared and the subsequent TMR0 interrupt is enabled. Otherwise, if all N current samples have been collected at 208, then, at 214, in order to await the next external μC interrupt 205, any pending TMR0 interrupt is cleared and subsequent TMR0 interrupts are disabled.

After either 212 or 214, even steps 216-232 acquire line cycle (e.g., without limitation, 60 Hz) data. First, at 216, it is determined if the default sampling channel is the low current channel (hi_current_sampling_counter=0). If so, then at 218, the line current (i_offset) is sampled with the low current channel 219 of ADC 30, and at 220, the analog ground reference (gnd) of ADC 30 is sampled with ADC channel 221. Step 222 calculates the signed, properly scaled current value (i_present) from the difference between the values from steps 218 and 220. On the other hand, if the default sampling channel is the high current channel, then at 224, the line current (i_offset) is sampled with the high current ADC channel 225, and at 226, the analog ground reference (gnd) of ADC 30 is sampled with ADC channel 221. Step 228 calculates the signed, properly scaled current value (i_present) from the difference between the values from steps 224 and 226, with the difference being shifted left by 2 example bits to provide proper scaling. Here, in this example, the "left shift by 2" is a result of the gains of the two 60 Hz current sampling channels differing by a factor of four. Next, after 222 or 228, step 230 determines if the low current ADC channel 219 is likely saturated. For example, this is determined if the magnitude of the current value (i_present) exceeds 384. The example ADC 30 has 10 bits or 1024 counts of amplitude resolution, and a scaling such that 1 Apeak~=9 A/D counts. A magnitude of "i_present" greater than 384 corresponds to a line current magnitude that is greater than about 42 Apeak. Thus, if the magnitude of an individual sample of 60 Hz current exceeds 384 (or about 42 Apeak), the μP 32 switches to sampling with the 200 Apeak, 60 Hz current channel. The value 384 was arbitrarily chosen because it is 75% of the maximum signed output count value (e.g., 512) of the ADC 30. If the test passes at 230, then the variable hi_current sampling_counter is set to N1 (e.g., without limitation, 4; any suitable count). This sets the line current sampling to the high current ADC channel 225 for the remainder of this half-cycle and for the next N1 half-cycles.

Figure 3A:
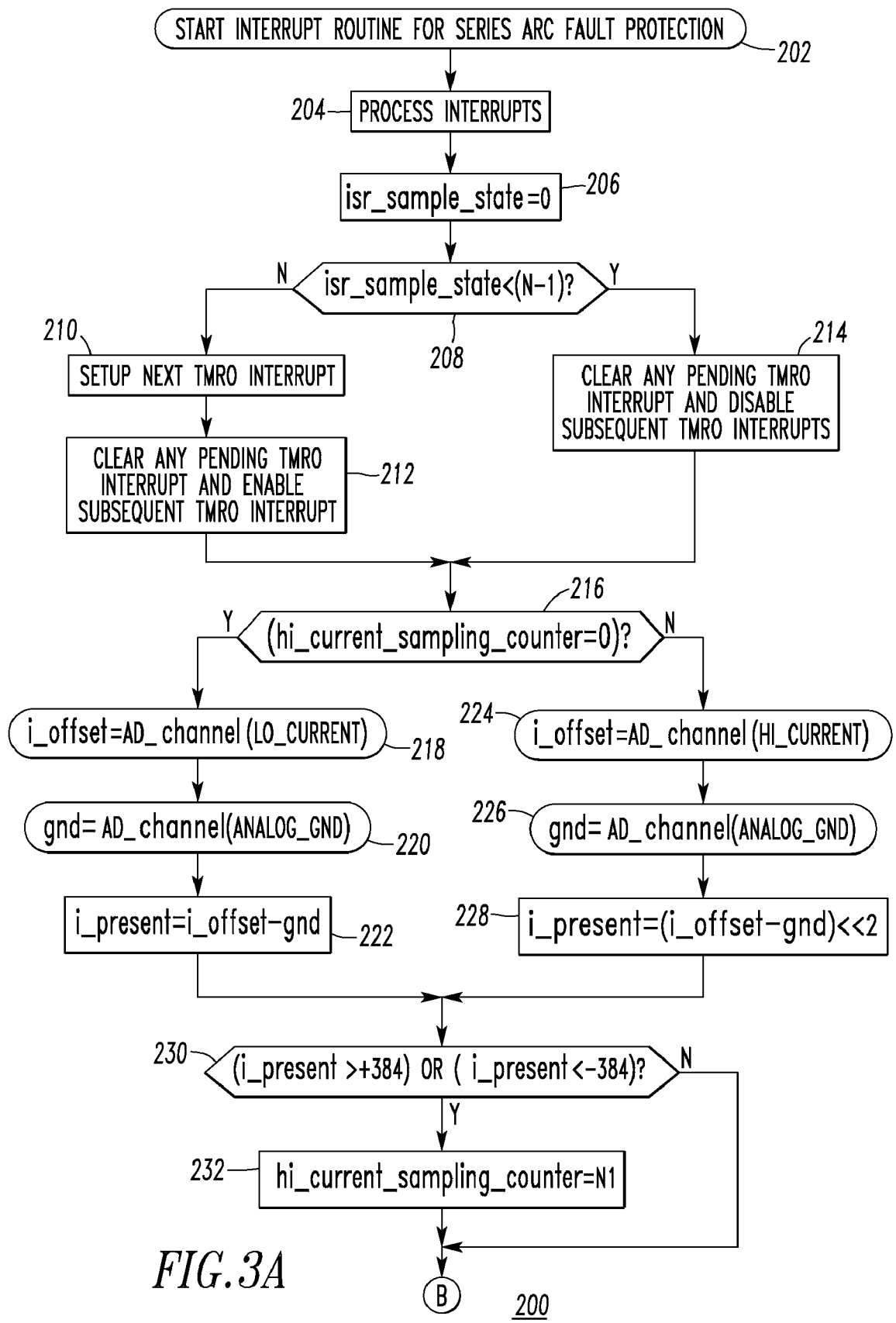
Figure 3B:
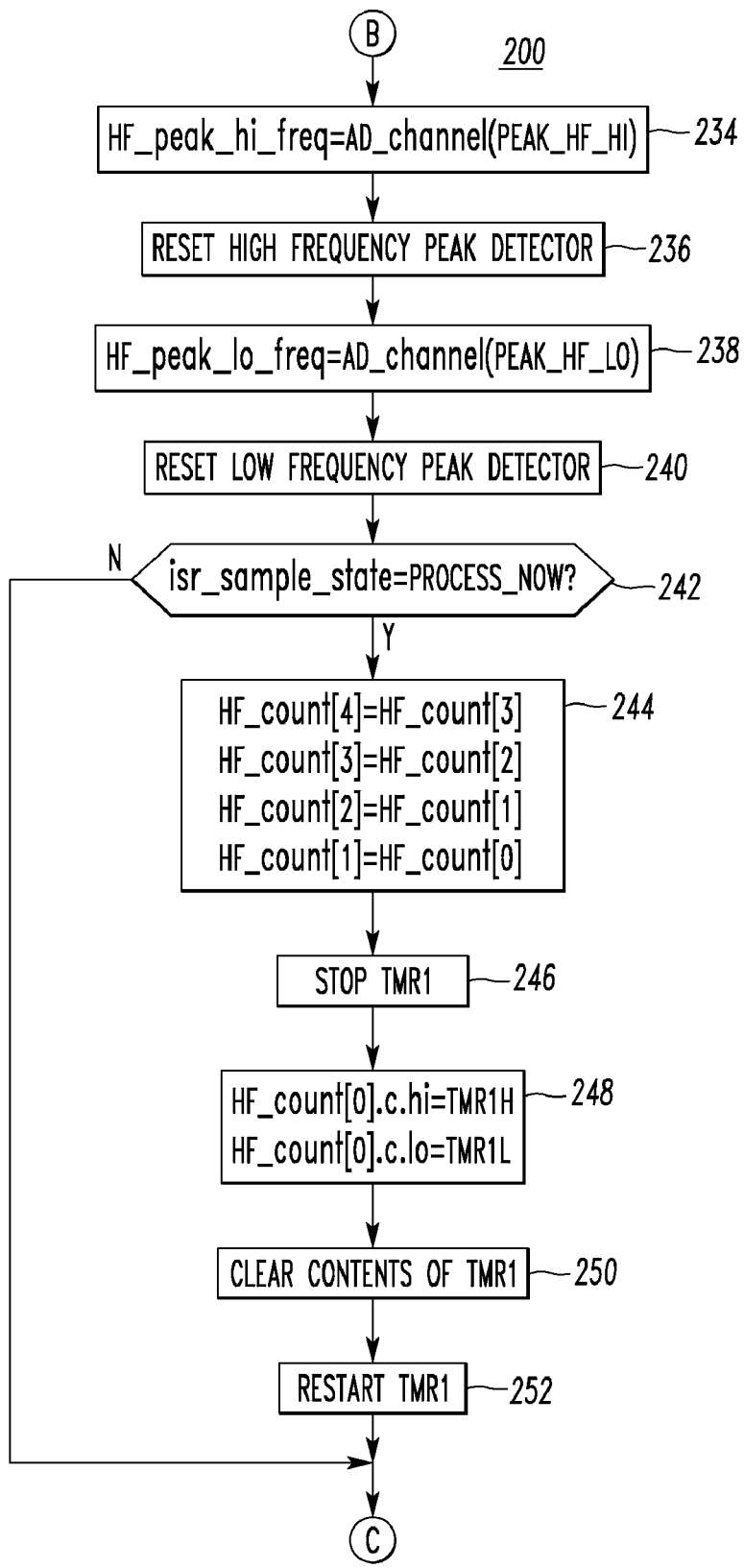

Next, after 232, or if the test at 230 failed, even steps 234-240 of FIG. 3B acquire high frequency (HF) peak detector data. First, at 234, the output of high frequency peak detector 60 is read (HF_peak_hi_freq) from the corresponding channel 235 of ADC 41. Next, at 236, the high frequency peak detector 60 is reset by μC output 241. Then, at 238, the output of the low frequency peak detector 58 is read (HF_peak_lo_freq) from the corresponding channel 239 of ADC 30. Next, at 240, the low frequency peak detector 58 is reset by μC output 237.

After 240, step 242 determines if it is an appropriate time to finalize the acquisition of a "HF count" at steps 244 and 248. "HF count" is determined from μC counter (TMR1) 74 of FIG. 1. This counter 74 counts outputs from the two envelope detectors 62,64 which are within the ranges (i.e., each range tests for the corresponding envelope detector output being greater than a predetermined minimum value and being less than a predetermined maximum value) set by the two envelope detectors 62,64, respectively. The two comparators 66,68 compare envelope detector outputs with respective predetermined minimum values REFA,REFB. When either or both of the outputs of the two envelope detectors 62,64 are active, the counter 74 is incremented.

At 242, the appropriate time to finalize the acquisition of the "HF count" is determined if the variable (isr_sample_state) that keeps track of current samples is equal to a suitable value (PROCESS_NOW) (e.g., 8; any suitable value). The software for the AFCI circuit breaker 2 is generally organized in two parts: (1) data collection; and (2) data processing. Known AFCI data processing is implemented within an interrupt period that coincides with the zero crossing of the line-to-neutral voltage 17. The disclosed software implementation is different in that it allows data processing to occur during any interrupt period. Thus, any value of PROCESS_NOW of 0 to (N−1) should be suitable. If the test passes at 242, then even steps 244-248 acquire the "HF count" for the present half-cycle and update the old values for the "HF count" from a suitable number of previous half-cycles. First, step 244 saves the old values of "HF count". Next, at 246, the μC counter (TMR1) 74 is stopped. Then, at 248, the present value of TMR1 (e.g., without limitation, the timer's high and low bytes) is stored. Next, steps 250 and 252 respectively clear the contents of and restart TMR1. After 252, or if the test failed at 242, execution resumes at 254 of FIG. 3C1 which processes HF peak detector information.

Even steps 254-268 calculate a baseline at 268 that is the average value of the last eight values of the output of the low frequency peak detector 58 (HF_peak_lo_freq) that are less than a suitable threshold value. First, at 254, it is determined if the present low frequency peak detector output (238 of FIG. 3B) is less than HF_PEAK_THRESH_LF_LOWER_LIMIT (e.g., without limitation, 100; any suitable value). If not, then execution resumes at 270 of FIG. 3C2. Otherwise, if the test at 254 was met, then at 256, the present value of the low frequency peak detector output is added to a tally (HF_peak_lo_freq_tally), and at 258, the oldest value of the low frequency peak detector output (which is pointed to by pointer HF_peak_lo_freq_array_ptr) is subtracted from the tally. Then, at 260, the present value of the low frequency peak detector output is stored an array (HF_peak_lo_freq_array) as referenced by the pointer of 258. This present value replaces the oldest value in the array. Next, at 262, the pointer of 258 is incremented. Step 264 determines if the array pointer of 258 is pointing beyond the end of the array by checking if it exceeds a suitable value (e.g., without limitation, 7, since in this example the array is of size 8). If not, then execution resumes at 268. If so, then the pointer is cleared at 266, in order to point to the beginning of the array. Next, at 268, a baseline (HF_peak_lo_freq_baseline) is calculated as the average of the last eight values of the low frequency peak detector output, which are less than the corresponding lower limit of step 254. Then, at 270 of FIG. 3C2, a threshold (HF_peak_lo_freq_thresh) is calculated as the sum of the fixed lower limit threshold of step 254 plus a suitably weighted (e.g., without limitation, 3x) baseline from step 268 (3*HF_peak_lo_freq_baseline).

Even steps 272-288 calculate a baseline at 286 of FIG. 3C3 that is the average value of the last eight values of the output of the high frequency peak detector 60 (HF_peak_hi_freq) that are less than a suitable threshold value. First, at 272, it is determined if the present high frequency peak detector output (234 of FIG. 3B) is less than HF_PEAK_THRESH_HF_LOWER_LIMIT (e.g., without limitation, 60; any suitable value). If not, then execution resumes at 288 of FIG. 3C3. Otherwise, if the test at 272 was met, then at 274, the present value of the high frequency peak detector output is added to a tally (HF_peak_hi_freq_tally), and at 276, the oldest value of the high frequency peak detector output (which is pointed to by pointer HF_peak_hi_freq_array_ptr) is subtracted from the tally. Then, at 278, the present value of the high frequency peak detector output is stored an array (HF_peak_hi_freq_array) as referenced by the pointer of 276. This present value replaces the oldest value in the array. Next, at 280, the pointer of 276 is incremented. Step 282 of FIG. 3C3 determines if the array pointer of 276 is pointing beyond the end of the array by checking if it exceeds a suitable value (e.g., without limitation, 7, since in this example the array is of size 8). If not, then execution resumes at 286. If so, then the pointer is cleared at 284, in order to point to the beginning of the array. Next, at 286, a baseline (HF_peak_hi_freq_baseline) is calculated as the average of the last eight values of the high frequency peak detector output, which are less than the corresponding lower limit of step 272. Then, at 288, a threshold (HF_peak_hi_freq_thresh) is calculated as the sum of the fixed lower limit threshold of step 272 plus a suitably weighted (e.g., without limitation, 3x) baseline from step 286 (3*HF_peak_hi_freq_baseline).

Next, step 290 compares the ADC-converted outputs of the two band pass filter peak detectors 58,60 to their respective thresholds of steps 270 and 288 to determine if either or both of the two current values of the peak detectors 58,60 indicate arcing. Here, the output of the low frequency band pass filter peak detector 58 is also checked to ensure that it is also less than an upper limit (HF_PEAK_THRESH_LF_UPPER_LIMIT) (e.g., without limitation, 250). This last check is done to eliminate certain loads that generate relatively strong repetitive signals at relatively lower frequencies. If this test passes, then an HF peak tally (HF_peak_tally_present) for the present half-cycle is increased by a suitable value (SERIES_ACCUM_RATE) (e.g., without limitation, 20) at 292. In this example, there is no upper threshold for the relatively higher frequencies. This is because certain loads (not shown) generate repetitive signals that can be higher than the upper threshold at the relatively lower frequencies.

Figure 3D:
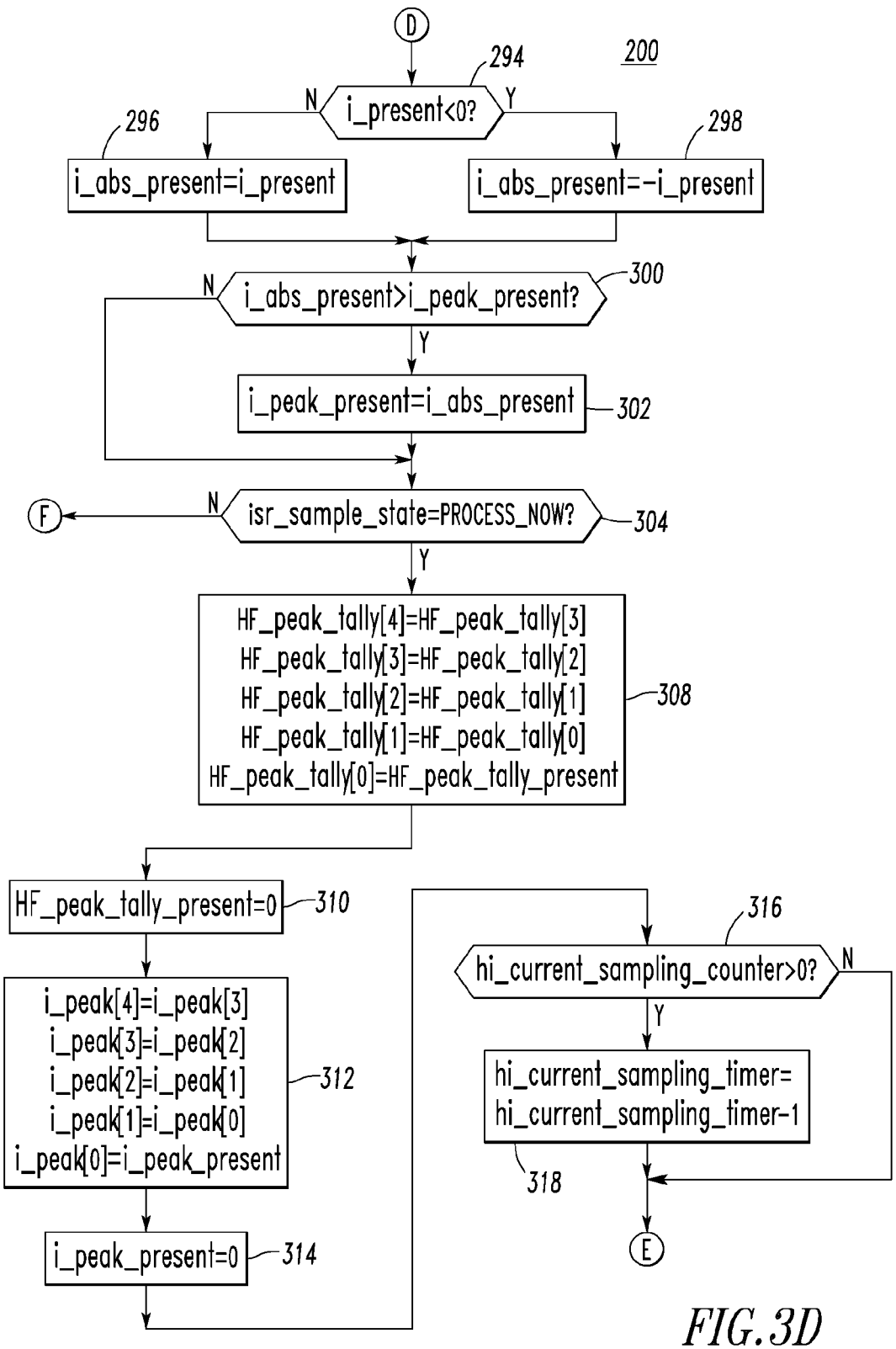

After 292, or if the test failed at 290, the peak value of the line current is captured at even steps 294-302 of FIG. 3D. At 294, it is determined if the scaled current value (i_present) of steps 222 or 228 (FIG. 3A) is negative. If not, then the absolute value of current (i_abs_present) is simply the same current value at 296. Otherwise, the absolute value of current (i_abs_present) is the negative of that current value at 298. After either 296 or 298, at 300, it is determined if the absolute value of the present current sample is greater than the content of a peak detector variable (i_peak_present). If so, then the peak detector variable is set equal to the absolute value of the present current sample at 302. Next, after 302 or if the test at 300 failed, even steps 304-318 perform processing of various data for the series arc detection routine of FIGS. 3E1-3E2.

At 304, it is determined if it is an appropriate time to perform the series arc detection algorithm 305 of FIG. 3E1. This is determined if the counter (isr_sample_state) that keeps track of current samples is equal to a suitable value (PROCESS_NOW). There are 8 example samples per half-cycle. The data processing that occurs when "isr_sample_state" equals "PROCESS_NOW" occurs after every 8 sampling periods.

If the test fails at 304, then execution resumes at step 342 of FIG. 3E2. On the other hand, at 308, the present value of the "HF peak tally" (HF_peak_tally_present) of step 292 of FIG. 3C3 is pushed into a corresponding FIFO stack. HF_peak_tally present is a running tally that indicates the number of local minimums and maximums that occurred in the previous half-cycle of like polarity. This is a temporary bucket for the previous half cycle and will be put into the trip bucket if certain conditions are met.

Referring again to steps 290 and 292 of FIG. 3C3, "HF_peak_tally_present" is a temporary running tally of the number of times the conditions specified in step 290 are true within a given half-cycle. When this value is finalized (during data processing, which occurs during one sampling interval per half-cycle, at the conclusion of the sample when "isr_sample_state" equals "PROCESS_NOW"), the value of "HF_peak_tally present" is transferred into the "HF_peak_tally" FIFO array. At 308, this value is transferred to HF_peak_tally[0] after the present half-cycle is completed. Then, at 310, the present value of "HF peak tally" is cleared. Next, at 312, the present value of the peak current (i_peak_present) of 302 is pushed into a corresponding FIFO stack. Then, at 314, the present value of the peak current (i_peak_present) is cleared. Next, at 316, it is determined if the high current channel is selected by determining if the variable hi_current_sampling_counter is greater than zero. If so, then that variable, which keeps track of the number of half-cycles of high current channel sampling, is decremented at 318. The intent is to sample the 60 Hz current for a few (e.g., N1=4) half-cycles of samples on the high current, low resolution ADC channel before switching back to the low current, high resolution ADC channel.

After 318, or if the test failed at 316, the series arc fault routine 305 of FIG. 3E1 begins. First, at 319, it is determined if the present peak line current (i_peak[0]) is greater than a suitable threshold (SERIES_AMPLITUDE_INHIBIT_THRESH) (e.g., without limitation, 30 $A_{RMS}$ or 42.4 A peak). If so, then at 320, a series amplitude inhibit timer (series_amplitude_inhibit_timer) is set to a suitable value to inhibit series arc protection (e.g., without limitation, 24 half-cycles or 200 mS). Otherwise, at 322, it is determined if the series amplitude inhibit timer is greater than zero. If so, then at 324, the series amplitude inhibit timer is decremented. Next at 326, which occurs after 320, 324 or if the test at 322 failed, it is determined if there is series arcing by looking for counter chaos and no recent line cycle peak currents greater than the threshold of 319. Here, for the test to pass, the series amplitude inhibit timer is zero, the present value of the "HF peak tally" (HF_peak_tally[0]) of step 308 (FIG. 3D) is non-zero, and counter chaos exists as is determined by the present value of "HF count" of step 248 (FIG. 3B) being different that the immediately previous value of "HF count" of like polarity (HF_count[2]). If so, then at 328, the contents of the present value of the "HF peak tally" are added to a series chaos accumulator (series_accum). If not, then at 330, the series chaos accumulator is decreased by a suitable decay rate (SERIES_DECAY_RATE) (e.g., without limitation, 8; any suitable value).

After either 328 or 330, at 332, it is determined if the series chaos accumulator is negative. If so, then the series chaos accumulator is set to zero at 334. Next, at 336, which occurs after 334 or if the test at 332 failed, the series arc fault routine 305 determines if a hazardous condition in the form of a series arc fault has occurred by checking if the series chaos accumulator is greater than a suitable trip threshold (SERIES_TRIP_LEVEL) (e.g., without limitation, 300; any suitable value). If so, then the circuit breaker 2 is tripped by setting the output 38 (SCR_GATE) (FIG. 1) true.

Next, at 342 of FIG. 3E2, which occurs after 338 or if the test at 336 failed, the sampling index (isr_sample_state) of 206 (FIG. 3A) is incremented. Next, at 346, it is determined if the next interrupt should be a timer interrupt (from TMR0 72) by checking if the sampling index (isr_sample_state) of 206 (FIG. 3A) is less than N−1. If so, then at 348, the external µC interrupt 205 is disabled and any pending external µC interrupt is cleared. Otherwise, the next interrupt should be the external µC interrupt 205, and step 350 clears any pending external µC interrupt and enables subsequent external µC interrupts. Next, after either 348 or 350, at 352, any pending TMR0 interrupts are cleared. Finally, any subsequent interrupts are enabled at 356 before the routine ends at 358. Steps 348,350,352,356 gracefully handle any interrupt that occurs unexpectedly.

EXAMPLE 7

Preferably, the µP 32 of FIG. 1 is structured to introduce "jitter" in the otherwise periodic data sampling times of the outputs of the peak detectors 58,60 as sensed through the respective ADC channels 239,235. One approach to eliminate repetitive high frequency signals generated by certain loads, such as dimmers, is to check if the variation between two adjacent peak values falls within a predefined range, such as 5%. If the variation falls within the predefined range, then the detected peak signal will not be counted as an arc fault generated signal. The "jitter" eliminates false series arc indication due to consistent large variations between two adjacent peak values caused by the periodic timer interrupt from the µP timer TMR0 72. When the circuit breaker 2 protects a dimmer (not shown) and an incandescent lighting load (not shown), the high frequency pulse associated with the turn-on of dimmer current occasionally coincides with the time when the high frequency peak detectors 58,60 are being reset (or clamped at zero volts) by the respective µP outputs 237,241. When this happens, the peak detectors 58,60 do not record the full peak value of the dimmer turn-on. Introducing "jitter" (i.e., random variations) in the timing of the otherwise periodic sampling intervals attempts to ensure that the periodic reset of the peak detectors 58,60 would infrequently coincide with the turn-on of any dimmer loads.

Alternatively, as shown at 326 of FIG. 3E 1, this function is achieved by the counter outputs (|HF_count[0]−HF_count[2]|>1).

Figure 4:
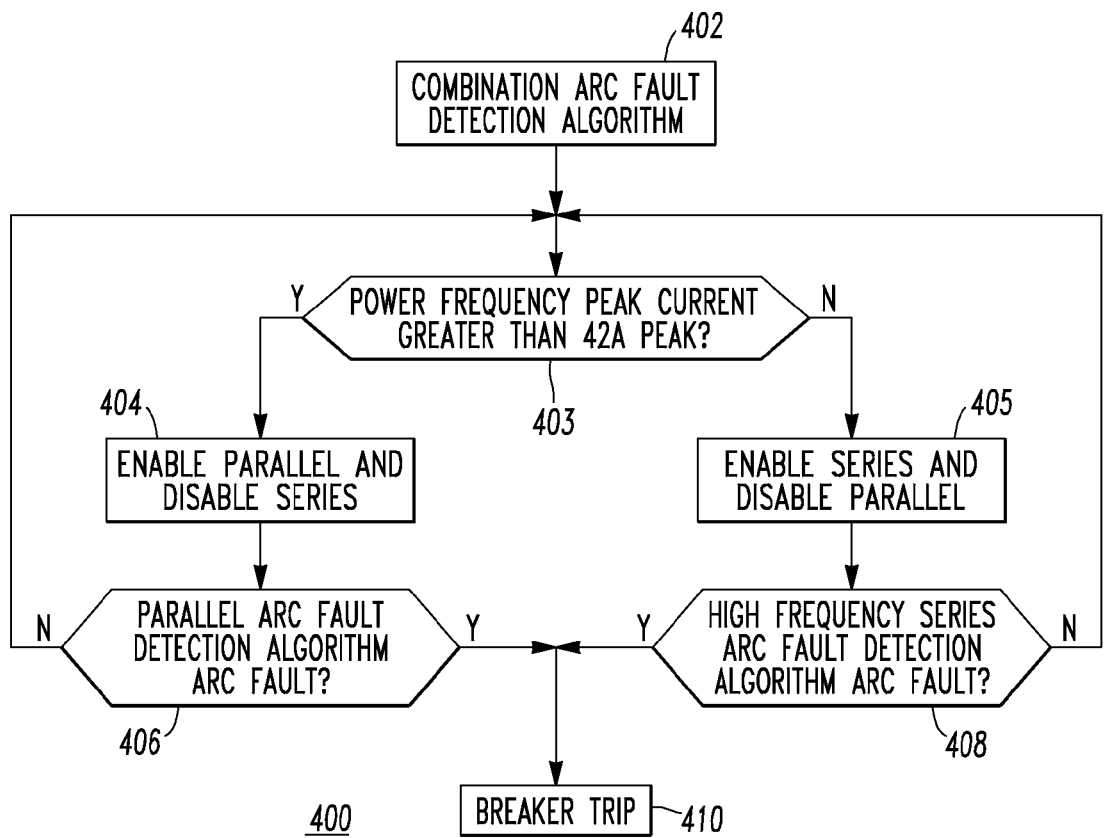
FIG. 4 is a flowchart of a series/parallel arc fault detection routine executed by the processor of FIG. 1.

Referring to FIG. 4, the parallel/series arc fault detection routine 400 is shown. After starting at 402, at 403, it is determined if the peak load (e.g., 60 Hz) current sensed by current sensor 8 is greater than, for example, 42 A peak. If so, then at 404, the parallel arc fault detection routine 34 of FIGS. 2A1-2A2 and 2B is enabled and the series arc fault detection routine 200 of FIGS. 3A, 3B, 3C1-3C3, 3D and 3E1-3E2 is disabled for a predetermined time (e.g., without limitation, a number of seconds; at least one second). If at the end of the predetermined time, the peak current is still higher than 42 A peak, then the parallel arc fault detection routine 34 will continue to be enabled and the series arc fault detection routine 200 will be disabled again for the predetermined time. On the other hand, if the test fails at 403, then, at 405, the series arc fault detection routine 200 is enabled and the parallel arc fault detection routine 34 is disabled for the predetermined time. If at the end of the predetermined time, the peak current is still less than 42 A peak, then the series arc fault detection routine 200 will continue to be enabled and the parallel arc fault detection routine 34 will be disabled again for the predetermined time. After 404 or 405, if the enabled one of the routines 34 and 200 determines a corresponding parallel or series arc fault at 406 and 408, respectively, then the circuit breaker 2 is tripped at 410. Otherwise, step 403 is repeated.

In the routine 400, a predetermined peak load current value (e.g., without limitation, 42 A peak) is employed. Below this value, the low current series arc fault detection using high frequency current "noise" associated with such arcs is enabled and the high current parallel arc fault detection using the load current together with power factor is disabled for the predetermined time. Otherwise, above this value, the low current series arc fault detection using high frequency current "noise" associated with such arcs is disabled for the predetermined time and the high current parallel arc fault detection using load current together with power factor is enabled.

EXAMPLE 8

Although FIG. 1 shows two (N=2) band pass filters 54,56, the invention is applicable to any suitable number (N) of band pass filters. As non-limiting examples, if N=1, then the frequency (f1) of the single band pass filter is: 100 kHz<f1<1 MHz; if N=2, then the frequencies (f1 and f2) of the two band pass filters are: 80 kHz<f1<300 kHz, and 700 kHz<f2<1 MHz; and if N=3, then the frequencies (f1, f2 and f3) of the three band pass filters are: 80 kHz<f1<300 kHz, 400 kHz<f2<600 kHz, and 700 kHz<f3<1 MHz.

EXAMPLE 9

For N=1, the single frequency (f1) should be able to provide adequate indications for detecting an arc fault while not nuisance tripping on electrical loads. In the two-frequency (N=2) case, signals at both f1 and f2 are used to trip the circuit breaker 2 using an "or" function. If N=1, then it will only depend on the signal at f1 to trip the circuit breaker 2.

EXAMPLE 10

For N=3, three suitable ranges of frequencies (f1, f2 and f3) may be employed. As another non-limiting example, 10 kHz<f1<80 kHz, 800 kHz<f2<1 MHz, and 1.9 MHz<f3<2 MHz.

Although separable contacts 4 are disclosed, suitable solid state separable contacts may be employed. For example, the disclosed circuit breaker 2 includes a suitable circuit interrupter mechanism, such as the separable contacts 4 that are opened and closed by the operating mechanism 6, although the invention is applicable to a wide range of circuit interruption mechanisms (e.g., without limitation, solid state or FET switches; contactor contacts) and/or solid state based control/protection devices (e.g., without limitation, drives; soft-starters).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. An arc fault circuit interrupter comprising:
separable contacts;
a neutral conductor;
an operating mechanism structured to open and close said separable contacts;
at least one current sensor structured to sense current flowing through said separable contacts and output a sensed current value; and
a processor comprising a first routine structured to provide parallel arc fault detection, a second routine structured to provide series arc fault detection, and a third routine structured to enable said first routine and disable said second routine when said sensed current value is greater than a predetermined value and to enable said second routine and disable said first routine when said sensed current value is less than said predetermined value, wherein said processor is structured to cooperate with one of said at least one current sensor to determine and store a plurality of peak values of the sensed current value for a plurality of half-cycles of said current flowing through said separable contacts; wherein said first routine is further structured to determine at least one of: (a) whether a first predetermined plurality of said half-cycles of said current occur in succession and correspond to a non-unity power factor, and to responsively inhibit said parallel arc fault detection for a first predetermined time, and (b) whether a second predetermined plurality of said half-cycles of said current occur in succession and each of said second predetermined plurality of said half-cycles of said current has a smaller peak amplitude than that of an immediately preceding one of said half-cycles of said current of like polarity or of differing polarity, and to responsively inhibit said parallel arc fault detection for a second predetermined time; and wherein said processor is further structured to determine that said parallel arc fault detection is not inhibited for at least one of said first predetermined time and said second predetermined time, and to responsively indicate that at least one of said half-cycles of said current having a peak amplitude greater than or equal to a predetermined amount is a parallel arc.

2. The arc fault circuit interrupter of claim 1 wherein said processor is further structured to indicate a parallel arc fault in response to a predetermined plurality of occurrences of said parallel arc, said occurrences each being separated from one another by no more than a third predetermined time.

3. The arc fault circuit interrupter of claim 2 wherein said processor is further structured to trip open said separable contacts in response to said indicate a parallel arc fault.

4. The arc fault circuit interrupter of claim 1 wherein said processor is further structured to determine both of said (a) whether a first predetermined plurality of said half-cycles of said current occur in succession and correspond to a non-unity power factor and said (b) whether a second predetermined plurality of said half-cycles of said current occur in succession and each of said second predetermined plurality of said half-cycles of said current has a smaller peak amplitude than that of an immediately preceding one of said half-cycles of said current of like polarity or of differing polarity; and wherein said processor is further structured to determine that said parallel arc fault detection is not inhibited for both of said first predetermined time and said second predetermined time.

5. The arc fault circuit interrupter of claim 1 wherein said processor is further structured to sense a zero crossing of a line-to-neutral voltage between one of said separable contacts and said neutral conductor, and to determine whether said sensed current value corresponds to a non-unity power factor for each of said half-cycles of said current.

6. The arc fault circuit interrupter of claim 1 wherein said predetermined value is 42 A peak.

7. An arc fault circuit interrupter for an alternating current power circuit including a plurality of half-cycles, said arc fault circuit interrupter comprising:
separable contacts;
an operating mechanism structured to open and close said separable contacts;
at least one current sensor structured to sense current flowing through said separable contacts and output a sensed current value;
a processor comprising a first routine structured to provide parallel arc fault detection, a second routine structured to provide series arc fault detection, and a third routine structured to enable said first routine and disable said second routine when said sensed current value is greater than a first predetermined value and to enable said second routine and disable said first routine when said sensed current value is less than said first predetermined value;
a first band pass filter cooperating with one of said at least one current sensor to output a first pass band having a first range of frequencies of said sensed current;
a second band pass filter cooperating with one of said at least one current sensor to output a second pass band having a second range of frequencies of said sensed current, said second range of frequencies not overlapping and being greater than said first range of frequencies;
a first peak detector cooperating with said first band pass filter to detect a plurality of first peak current values from said first pass band;
a second peak detector cooperating with said second band pass filter to detect a plurality of second peak current values from said second pass band;
a first envelope detector cooperating with said first band pass filter to detect a plurality of first occurrences from said first pass band being within a first predetermined range of magnitudes;
a second envelope detector cooperating with said second band pass filter to detect a plurality of second occurrences from said second pass band being within a second predetermined range of magnitudes; and
a counter structured to count said first and second occurrences,
wherein said second routine is further structured to disable said series arc detection when the sensed current is greater than a second predetermined value,
wherein said processor cooperates with said counter to determine a plurality of counts from said counter for said half-cycles,
wherein said processor further cooperates with said first and second peak detectors to determine a plurality of tallies responsive to one of said first peak current values exceeding a first threshold for said half-cycles or one of said second peak current values exceeding a second threshold for said half-cycles,
wherein said processor is structured to determine presence of series arcing in said power circuit from: (1) said sensed current being less than said second predetermined value for at least a predetermined time, (2) the tally for a current one of said half-cycles being not zero, and (3) the count of said counter for the current one of said half-cycles being different than the count of said counter for an immediately previous one of said half-cycles of like polarity by at least a third predetermined value, and wherein said processor is further structured to increase a series chaos accumulator responsive to said presence of series arcing.

8. The arc fault circuit interrupter of claim 7 wherein said first and second thresholds are first and second lower thresholds, respectively, both of said first and second lower thresholds being structured to enable said processor to detect noise generated by a series arc fault; and wherein said processor is further structured to determine said plurality of tallies responsive to said one of said first peak current values exceeding said first lower threshold and being less than a third upper threshold for said half-cycles or said one of said second peak current values exceeding said second lower threshold for said half-cycles.

9. The arc fault circuit interrupter of claim 7 wherein said first and second thresholds are first and second lower thresholds, respectively; wherein said first band pass filter has an output that is input by said first peak detector; wherein said second band pass filter has an output that is input by said second peak detector; and wherein said processor is further structured to remove baseline shifting of the outputs of said peak detectors.

10. The arc fault circuit interrupter of claim 7 wherein the minimum frequency of said first range of frequencies is about 50 kHz; wherein the maximum frequency of the second range of frequencies is about 2 MHz; and wherein each of said first and second band pass filters have a center frequency to bandwidth ratio of greater than about 5.

11. The arc fault circuit interrupter of claim 7 wherein said counter structured to count said first and second occurrences is structured to count high frequency pulses for each of said half-cycles to eliminate load noise associated with periodic high frequency signals.

12. The arc fault circuit interrupter of claim 7 wherein said processor is further structured to determine if said series chaos accumulator is negative and to responsively set said series chaos accumulator to zero.

13. The arc fault circuit interrupter of claim 7 wherein said processor comprises an output; and wherein said processor is further structured to determine the occurrence of a series arc fault when said series chaos accumulator is greater than a fourth predetermined value and to responsively set the output of said processor to cause said operating mechanism trip open said separable contacts.

14. The arc fault circuit interrupter of claim 7 wherein said processor is further structured to increase said series chaos accumulator by a predetermined amount responsive to said presence of series arcing.

15. The arc fault circuit interrupter of claim 7 wherein said processor is further structured to decrease said series chaos accumulator by a predetermined amount when said processor does not determine said presence of series arcing in said power circuit.

16. A method of detecting parallel arc faults or series arc faults for an alternating current power circuit, said method comprising:

sensing current flowing through said alternating current power circuit and outputting a sensed current value;

providing parallel arc fault detection;

providing series arc fault detection;

enabling said parallel arc fault detection and disabling said series arc fault detection for a predetermined time when said sensed current value is greater than a predetermined value;

otherwise, enabling said series arc fault detection and disabling said parallel arc fault detection for a predetermined time when said sensed current value is less than said predetermined value;

sensing a plurality of half-cycles of current flowing in said power circuit;

providing said parallel arc fault detection of said current flowing in said power circuit;

ignoring any of said half-cycles of current having a peak amplitude less than a predetermined amount;

determining at least one of:
(i) whether a first predetermined plurality of said half-cycles of current occur in succession and have non-unity power factor and responsively inhibiting said parallel arc fault detection for a first predetermined time, and
(ii) whether a second predetermined plurality of said half-cycles of current occur in succession and each of said second predetermined plurality of said half-cycles of current has a smaller peak amplitude than that of an immediately preceding one of said half-cycles of current of like polarity or of differing polarity, and responsively inhibiting said parallel arc fault detection for a second predetermined time; and determining whether said ignoring and said determining are not met, and responsively indicating that at least one of said half-cycles of current having a peak amplitude greater than or equal to said predetermined amount is a parallel arc.

17. The method of claim 16 further comprising counting occurrences of said parallel arc, which are each separated from one another by no more than a third predetermined time; and indicating a parallel arc fault in response to a predetermined plurality of said occurrences of said parallel arc, which are each separated from one another by no more than said third predetermined time.

18. The method of claim 16 further comprising tripping open separable contacts responsive to said indicating a parallel arc fault.

19. The method of claim 16 further comprising determining both of said (i) whether a first predetermined plurality of said half-cycles of current occur in succession and have non-unity power factor, and said (ii) whether a second predetermined plurality of said half-cycles of current occur in succession and each of said second predetermined plurality of said half-cycles of current has a smaller peak amplitude than that of an immediately preceding one of said half-cycles of current of like polarity or of differing polarity.

20. The method of claim 16 further comprising determining said (i) whether a first predetermined plurality of said half-cycles of current occur in succession and have non-unity power factor, in order to distinguish a motor start inrush current transient from a parallel arc fault.

21. The method of claim 16 further comprising determining said (ii) whether a second predetermined plurality of said half-cycles of current occur in succession and each of said second predetermined plurality of said half-cycles of current has a smaller peak amplitude than that of an immediately preceding one of said half-cycles of current of like polarity or of differing polarity, in order to distinguish an incandescent dimmer inrush current from a parallel arc fault.

22. The method of claim 16 further comprising
employing a voltage having a voltage zero crossing; and
for each of said half-cycles, determining if said current flowing in said power circuit at the voltage zero crossing has a different polarity than said current flowing in said power circuit about 90 degrees after said voltage zero crossing, and responsively indicating a non-unity power factor.

23. A method of detecting parallel arc faults or series arc faults for an alternating current power circuit, said method comprising:
sensing current flowing through said alternating current power circuit and outputting a sensed current value;
providing parallel arc fault detection;
providing series arc fault detection;
enabling said parallel arc fault detection and disabling said series arc fault detection for a predetermined time when said sensed current value is greater than a predetermined value;
otherwise, enabling said series arc fault detection and disabling said parallel arc fault detection for a predetermined time when said sensed current value is less than said predetermined value;
employing a first band pass filter to output a first pass band having a first range of frequencies of said sensed current value;
employing a second band pass filter to output a second pass band having a second range of frequencies of said sensed current value, said second range of frequencies not overlapping and being greater than said first range of frequencies;
detecting a plurality of first peak current values from said first pass band;
detecting a plurality of second peak current values from said second pass band;
detecting a plurality of first occurrences from said first pass band being within a first predetermined range of magnitudes;
detecting a plurality of second occurrences from said second pass band being within a second predetermined range of magnitudes;
counting said first and second occurrences and outputting a count value;
employing as said predetermined value a first predetermined value;
providing said series arc detection and disabling said series arc detection when said sensed current value is greater than a second predetermined value;
determining a plurality of counts from said count value for said half-cycles;
determining a plurality of tallies responsive to one of said first peak current values exceeding a first threshold for said half-cycles or one of said second peak current values exceeding a second threshold for said half-cycles;
determining presence of series arcing in said power circuit from: (1) said sensed current value being less than said second predetermined value for at least a first predetermined time, (2) the tally for a current one of said half-cycles being not zero, and (3) the count for the current one of said half-cycles being different than the count for an immediately previous one of said half-cycles of like polarity by at least a third predetermined value; and
increasing a series chaos accumulator responsive to said presence of series arcing.

24. The method of claim 23 further comprising
determining the occurrence of a series arc fault when said series chaos accumulator is greater than a fourth predetermined value and responsively interrupting said current flowing through said power circuit.

25. An arc fault circuit interrupter comprising:
separable contacts;
a neutral conductor;
an operating mechanism structured to open and close said separable contacts;
at least one current sensor structured to sense current flowing through said separable contacts and output a sensed current value; and
a processor comprising a first routine structured to provide parallel arc fault detection, a second routine structured to provide series arc fault detection, and a third routine structured to enable said first routine and disable said second routine when said sensed current value is greater than a predetermined value and to enable said second routine and disable said first routine when said sensed current value is less than said predetermined value, wherein said processor is structured to cooperate with one of said at least one current sensor to determine and store a plurality of peak values of the sensed current value for a plurality of half-cycles of said current flowing through said separable contacts; wherein said first routine is further structured to determine whether a predetermined plurality of said half-cycles of said current occur in succession and correspond to a non-unity power factor, and to responsively inhibit said parallel arc fault detection for a predetermined time; and wherein said processor is further structured to determine that said parallel arc fault detection is not inhibited for said predetermined time, and to responsively indicate that at least one of said half-cycles of said current having a peak amplitude greater than or equal to a predetermined amount is a parallel arc.

26. An arc fault circuit interrupter comprising:
separable contacts;
a neutral conductor;
an operating mechanism structured to open and close said separable contacts;
at least one current sensor structured to sense current flowing through said separable contacts and output a sensed current value; and
a processor comprising a first routine structured to provide parallel arc fault detection, a second routine structured to provide series arc fault detection, and a third routine structured to enable said first routine and disable said second routine when said sensed current value is greater than a predetermined value and to enable said second routine and disable said first routine when said sensed current value is less than said predetermined value, wherein said processor is structured to cooperate with one of said at least one current sensor to determine and store a plurality of peak values of the sensed current value for a plurality of half-cycles of said current flowing through said separable contacts; wherein said first routine is further structured to determine whether a predetermined plurality of said half-cycles of said current occur in succession and each of said predetermined plurality of said half-cycles of said current has a smaller peak amplitude than that of an immediately preceding one of said half-cycles of said current of like polarity or of differing polarity, and to responsively inhibit said parallel arc fault detection for a predetermined time; and wherein said processor is further structured to determine that said parallel arc fault detection is not inhibited for said predetermined time, and to responsively indicate that at least one of said half-cycles of said current having a peak amplitude greater than or equal to a predetermined amount is a parallel arc.

* * * * *